June 8, 1943. L. F. ATHY ET AL 2,321,450
SEISMIC SURVEYING
Filed Dec. 14, 1938 11 Sheets-Sheet 1

INVENTORS
Lawrence F. Athy
Elton V. McCollum
BY
Thos. E. Scofield
ATTORNEY

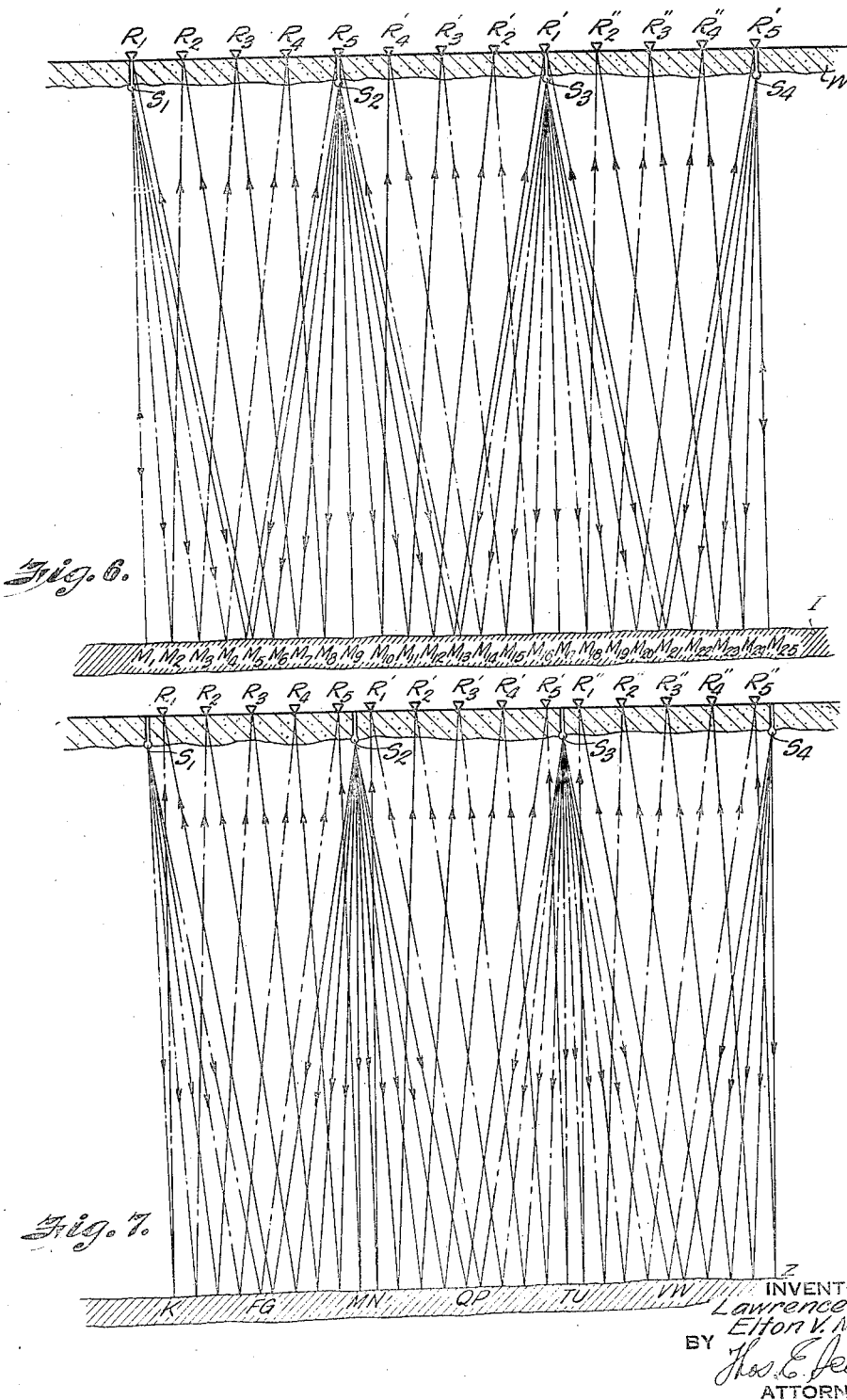

June 8, 1943.   L. F. ATHY ET AL   2,321,450
SEISMIC SURVEYING
Filed Dec. 14, 1938   11 Sheets-Sheet 4

INVENTORS
Lawrence F. Athy
Elton V. McCollum
BY
ATTORNEY

June 8, 1943.  L. F. ATHY ET AL  2,321,450
SEISMIC SURVEYING
Filed Dec. 14, 1938  11 Sheets-Sheet 5

INVENTORS
Lawrence F. Athy
Elton V. McCollum
BY
ATTORNEY.

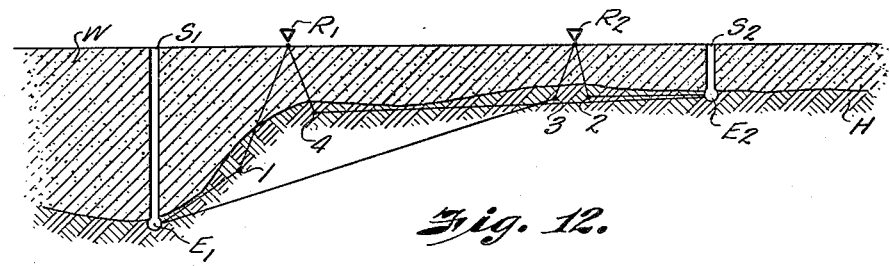
Fig. 12.
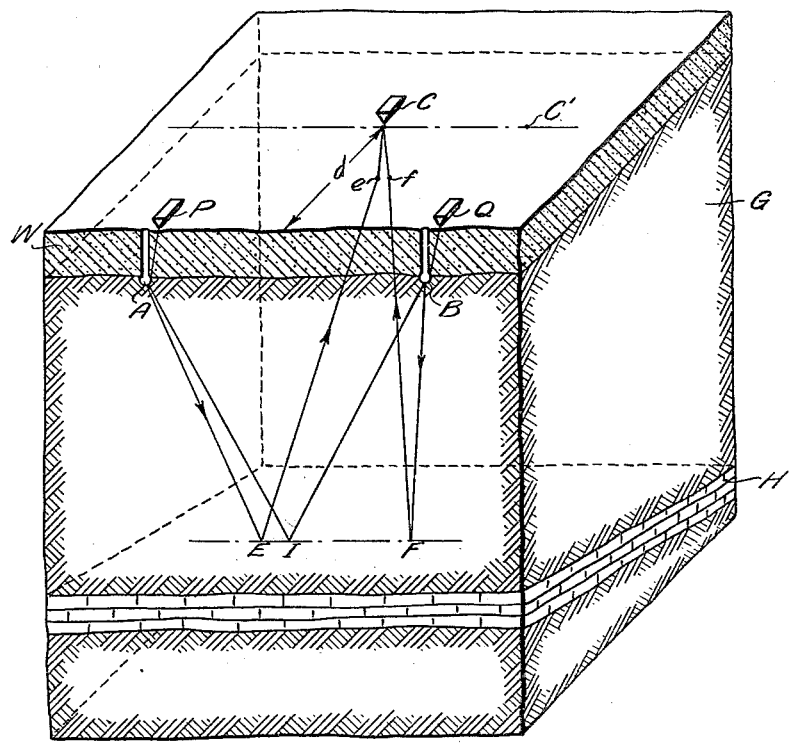
Fig. 13.
Fig. 14.

June 8, 1943.　　L. F. ATHY ET AL　　2,321,450
SEISMIC SURVEYING
Filed Dec. 14, 1938　　11 Sheets-Sheet 7

INVENTORS
Lawrence F. Athy
Elton K. McCollum
BY
ATTORNEY

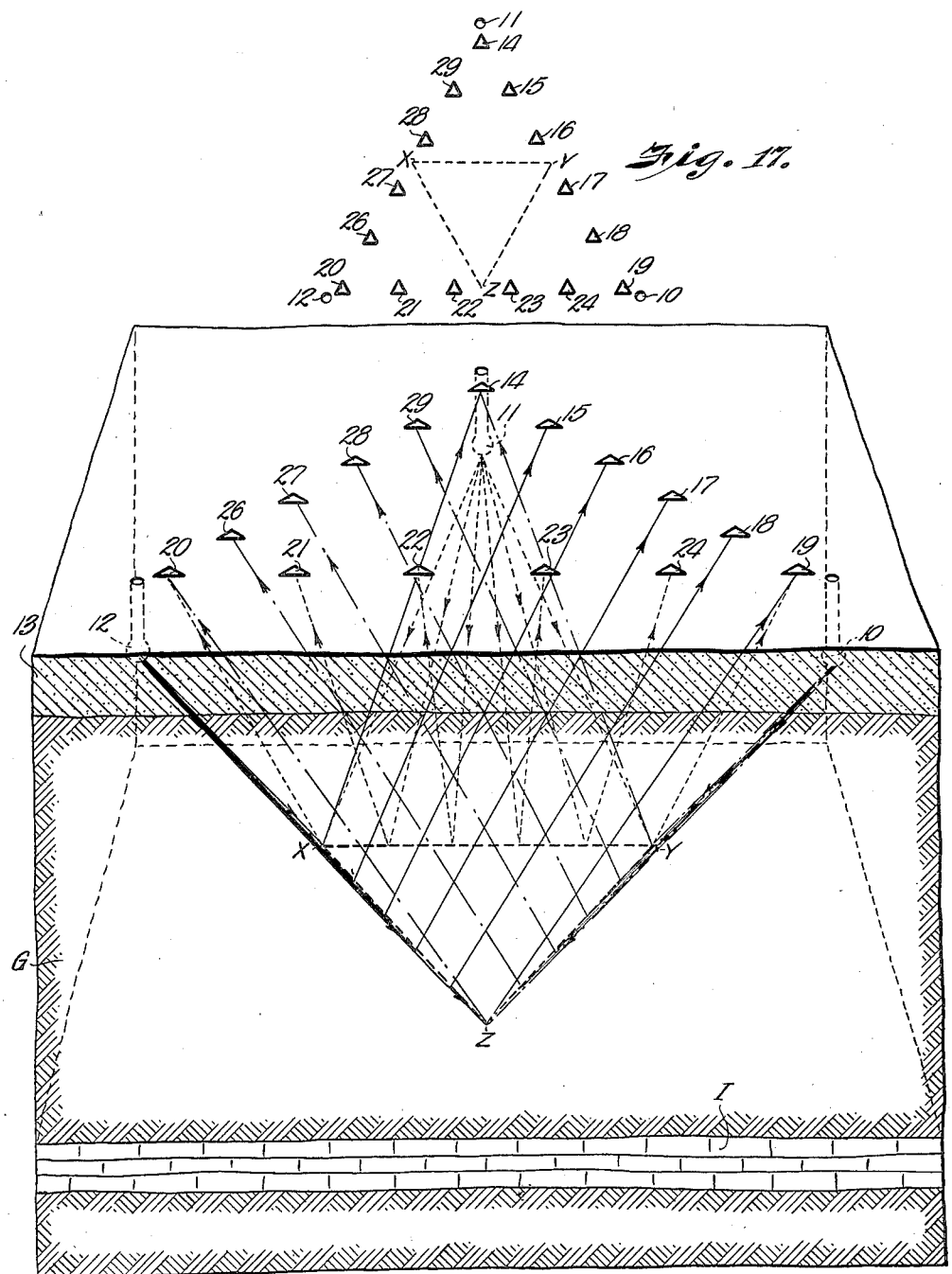

June 8, 1943.  L. F. ATHY ET AL  2,321,450
SEISMIC SURVEYING
Filed Dec. 14, 1938  11 Sheets-Sheet 9

INVENTORS
Lawrence F. Athy
Elton V. McCollum
BY
ATTORNEY

UNITED STATES PATENT OFFICE 2,321,450

SEISMIC SURVEYING

Lawrence F. Athy and Elton V. McCollum, Ponca City, Okla., assignors to Continental Oil Company, Ponca City, Okla., a corporation of Delaware Application December 14, 1938, Serial No. 245,653

21 Claims. (Cl. 181—0.5)

Our invention relates to seismic surveying and more particularly to a continuous profiling method of exploring for tectonic formations by reflection seismograph methods by which we are enabled to determine the continuous contour and shape of subsurface geological strata.

In the prior art, seismograph methods have been used for the detection of and the outlining of the shape or contour of domes, anticlines and other geological structures. Success has accompanied the methods of the prior art in certain restricted areas. In other areas, seismograph exploration has not resulted in aid to the geologist to the desired extent. The extreme variations in the weathered portion of the earth's crust and the inability of geophysicists to correlate records have definitely limited the usefulness of the seismic methods now generally known.

Seismic prospecting is ordinarily conducted by creating seismic waves by artificial means, generally by detonating dynamite or other explosives. The points at which the seismic waves are generated are usually spoken of as "shot points." In our method, we prefer to drill our shot holes below the weathered layer of the earth's surface and detonate our explosive charges near the bottom of the shot holes. When an explosion takes place, seismic waves are propagated in all directions. Some of the paths taken by the generated seismic waves are utilized in carrying out our invention. At the moment of the explosion, the earth in the immediate vicinity of the shot hole is violently disturbed to such an extent that, if a seismometer were placed in this area, the instrument and its auxiliary equipment would suffer a very severe transient shock, which might not be damped out until after useful seismic waves arriving at this point had passed. This interference in some instances practically obliterates the useful arrivals at the seismometer so that in such cases we prefer to displace our seismometers from the immediate vicinity of the shot hole.

The dynamite or other explosive used for the creation of seismic waves may be tamped by filling a shot hole with water. The explosion forcibly ejects the water from the shot hole. The rush of water and the gas resulting from the explosion, as well as the return of the water to the earth creates another type of disturbance in the vicinity of the shot hole which is obviated by displacing the seismometer from the shot hole. Another type of disturbance which is remedied by offsetting the receivers from the shot hole is that created by the arrival of low frequency, low velocity surface waves. These waves travel near the earth's surface. Filters may be employed to reject the low frequency components of these waves. Harmonics, however, are created, which fall within the range of reflection frequencies, which harmonics may cause record inaccuracies of considerable magnitude. Since the near surface, low frequency waves travel relatively slowly, the offsetting of seismometers permits the arrival of the useful, more rapidly traveling waves to be recorded. We have, at times, offset our seismometers several thousand feet from the shot holes in order to avoid the low frequency, near surface waves.

Reflection shooting makes use of arrivals of reflected seismic waves from the subsurface strata.

One method of conducting reflection shooting is known as the "depth or correlation method," in which accuracy depends upon the ability to identify and correlate reflections from particular reflecting horizons at various points over an area at which seismic reflection records are taken. The depth of the stratum is determined at the various points chosen. From these depths a subsurface contour map can be drawn, just as a contour map of the surface of the ground can be drawn by running a line of levels across the region. It is obvious that there is an absolute necessity to identify the reflections from any one stratum throughout the region, as otherwise the depths obtained are for different strata and the results are erroneous. Where such identification is possible, a highly accurate survey can be made.

Usually an observer identifies reflections from the same bed on a number of records from different survey stations by noticing certain characteristic peculiarities of the reflections which are found on all the records. Thus, a reflected wave of unusually high amplitude appearing on the records can be identified as coming from a bed with good reflecting properties throughout the region. Other peculiarities are known, all of which are said to give "character" to a particular reflection, and which render the reflection recognizable on various records. Again, it may be possible to find a set of reflected waves which appear in a certain spaced sequence in the records, through which identification is possible. Experienced observers will take advantage of all these possibilities to correlate their records.

It is evident that correlation is facilitated if the reflecting beds are continuous throughout the region surveyed, as otherwise the characteristic reflections disappear on certain records.

Thus, the usual method of correlation surveying is much more difficult, and often is absolutely impossible, in regions in which beds are discontinuous. Correlation surveying is also difficult in regions in which the beds change their lithologic character with distance, so that at one survey station a strong reflection is received from a certain bed, while only a weak reflection will be found from the same bed some distance away. Another situation which causes difficulty is that in which a large number of reflections of roughly the same amplitude are recorded at fairly uniform intervals, so that the identification of any one reflection on various records is virtually impossible. A second method of reflection surveying, known as the dip method, has been developed for use in such areas.

In using the dip method, emphasis is placed on the reflections obtained at each station. The depths and dips of the formations below the survey station are determined by computation from the records, in manners well known to the art. These depths and corresponding dips are plotted for each survey point, but no correlation of the reflections from one shot point to another is carried out. Contour lines can be drawn in, starting at any reflection horizon obtained at a station and following the dip of the bed until half way to the next station, at which point the dip is altered to that found at that depth at the second station. The general structure of the region and the slope of the beds can be determined, but the course of a particular bed can only be surmised. This is the gravest disadvantage in the method. Geological interpretation of the region is hampered, especially in petroliferous areas, where not only the general slope of the beds, but the continuity and depth of each bed is of importance. If faults occur between the survey stations, they will not be located since continuous coverage is not attempted. The conventional dip method is also less accurate than the correlation method. Not only is the method of computation more difficult, allowing greater chances for error, but the assumptions made (such as neglecting the effect of refraction on the wave paths) produce a greater inherent error than is present in the correlation method.

Extreme variation and heterogeneity in the weathered layer near the surface of the earth contribute many errors to geophysical seismograph work. Refraction arrivals have been used to calculate the thickness of the weathered layer by methods well known to the art. These methods are operative in certain ideal cases. When, however, weathering errors become most serious and corrections are greatly needed, the refraction method of determining weathering errors fails.

One object of our invention is to provide a means and method of carrying on continuous correlation surveying, even in regions with discontinuous beds, numerous reflections, changes in lithologic character of the strata giving weak reflections, or any other causes which would normally result in the abandonment of the usual correlation methods, free of errors caused by the weathered zone near the earth's surface.

Another object of our invention is to provide a method enabling us to trace continuously the reflection from any particular reflecting bed over the lateral extent of the bed.

Another object of our invention is to provide a method of geophysical prospecting by seismic means in which a reflection may be traced to determine the lateral extent or discontinuity of reflecting beds and thus determine the location of faults.

Another object of our invention is to provide a method of correlation shooting which may be employed over areas which it would be impossible to survey by known methods.

Other and further objects of our invention will appear from the following description.

In the accompanying drawings which form part of the instant specification and which are to be read in conjunction therewith:

Figure 6 is a sectional view through the earth's crust, similar to Figure 5, showing an arrangement of seismophones and shot points similar to that disclosed in Figure 3, showing paths taken by seismic waves in carrying out the method of our invention.

Figure 7 is another sectional view similar to that shown in Figure 6 in which the shot points are farther removed and offset from the seismometers in order to permit the avoidance of a major part of shot point noise and disturbance.

Figure 12 is a cross sectional view of a section of the earth's crust showing seismographic set-up under unfavorable weathering conditions.

Figure 13 is an isometric diagrammatic view of a section of the earth's crust showing an arrangement of shot hole and receiving points by which we are enabled to eliminate weathering inaccuracies.

Figure 14 is a plan view of an arrangement of shot holes and receiving points showing another means useful in carrying out our invention.

Figure 17 is a plan view of a polygonal arrangement of shot holes and receiving points capable of carrying out the method of our invention.

Figure 18 is a diagrammatic perspective view of a section of the earth's crust, showing the arrangement of shot holes and receiving points of Figure 17 and illustrating reflection paths of certain seismic waves during the practice of another mode embodying our invention.

Figure 1:
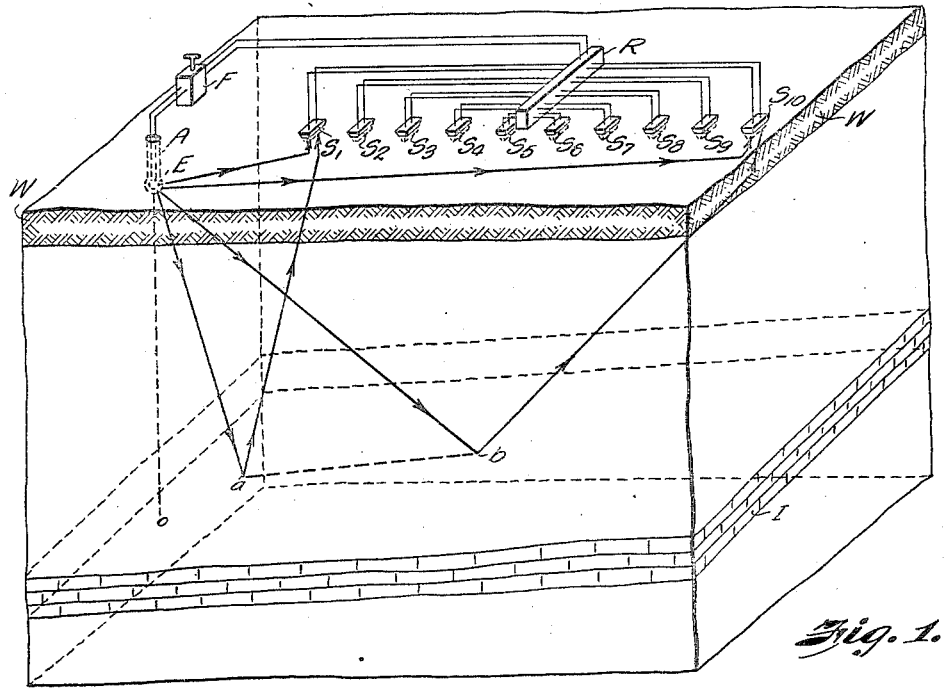
Figure 1 is an isometric diagrammatic view of an idealized section of the earth's crust illustrating the usual method of the prior art for reflection seismic surveying.

In using the normal method of reflection seismic surveying, illustrated in Figure 1, the seismometers are placed on a line radially away from the shot hole, with the first seismometer some 200 to 600 feet from the hole. In this figure ten seismometers, $S_1$, $S_2$, $S_3$, $S_4$, $S_5$, $S_6$, $S_7$, $S_8$, $S_9$ and $S_{10}$ are shown, but any number might be used depending upon the required accuracy of the survey. The distance between the first and last seismometer depends upon the steepness of the subsurface beds, the required accuracy of survey, etc., and is usually of the order of 600 to 2000 feet. This distance is known as the "spread" of the seismometers. These seismometers are connected to a recorder R, which usually includes a multi-channel amplifier and a multi-element oscillograph. A charge of explosive E is detonated in shot hole A by means of firing box F, causing seismic waves to be generated, which radiate in all directions. The instant of detonation is impressed on the recorder R which is electrically coupled to the firing circuit.

Certain of the paths of the waves important in the following discussion have been drawn in Figure 1. The first waves to reach the seismometers are the refracted waves which travel along the top of the consolidated formation just below the weathered zone W, constantly being refracted upwards. Certain of the other waves are traveling downward striking discontinuities such as interface I, at points such as $a$ and $b$, and are reflected up to strike the seismometers, causing corresponding electric waves to actuate the oscillograph elements. By using a number of seismometers placed between the first and last instruments, the operator can check as to which of the waves arriving at the seismometers are reflected from substrata, the criterion being that reflected waves from a given substratum strike all the instruments nearly at the same time, due to the approximate equality of the lengths of paths traveled by reflected waves, from the shot points to the various instruments. A refracted wave or surface wave strikes each seismometer in turn, considerable time elapsing between successive arrivals at the various instruments.

As is well known in the art, the depth and dip of a reflecting stratum can be computed from three quantities; the length of time taken for the waves reflected from the stratum to reach the seismometers, the slight difference in arrival times of reflected waves at the first and last seismometers, and the average velocity of the waves in the subsurface strata. This last quantity is determined by other methods and will not be discussed further in this disclosure. The first two quantities are read directly from each record.

From Figure 1 it is obvious that all the reflected waves from this particular reflecting stratum which arrive at the seismometers strike the bed between points $a$ and $b$. Thus, this particular stretch is the only part of the stratum to be surveyed. If seismometer $S_1$ could be placed adjacent to the shot hole A, the region surveyed would extend over from point $o$ to point $b$, point $o$ being the projection of the shot point on the reflecting stratum. Unfortunately it is difficult to detect reflections on a record from a seismometer close to the shot hole. Field experience has shown very definitely that if the first seismometer is placed closer than approximately 200 feet from the hole, the heavy surface vibrations make it difficult to determine reflections. For this reason, it is usually disadvantageous to survey the stretch between $o$ and $a$ by this system of reflection surveying.

This gap in the subsurface survey is very undesirable when using correlation methods. It is obvious from what has been said that in general the only way one can be definitely sure of recognizing the reflections from the same stratum at all the seismometers is that the reflected wave arrives at, e. g., seismometer $S_5$ only a little later or earlier than at seismometer $S_6$ and so on down the line. Thus, the reflection can be "carried over" through the record throughout the whole seismometer spread. If there is a fault between the points $a$ and $b$, it will be shown up on the records in that the reflection can be carried over from instrument to instrument only to a certain point, at which point the reflecting stratum changes elevation abruptly. The reflection from that stratum appears at the rest of the instruments at a different time on the record. Thus, the fault can be identified by the inability to carry over the reflection through the whole spread of instruments. If there is brecciation at or near the fault, the reflection is not received at the instruments whose reflection point on the bed falls in the broken area.

Again, the only way that one can be definitely sure of recognizing the reflections from the same stratum on records from adjacent setups is that it is possible to carry over (or correlate) the same reflections on both records. However, when the seismometer spread is moved to the other side of the shot hole as in the usual practice, the ability to carry over the reflections is lost due to the gap between the reflection points corresponding to the distance from the shot hole to the first seismometer on each side of the shot hole. There is no longer a continuous survey of the reflecting stratum between point $a$, Figure 1, and the similar point corresponding to the position of the first seismometer on the opposite side of the hole. Even if a reflection is found on the new record at the time predicted from the dip, strike, and depth of the bed as calculated from the first record, there is no assurance whatever that this reflection is from the same bed. It is impossible to tell whether or not the dip of the bed has changed abruptly somewhere in the gap, or whether faulting or bed termination has occurred in the same intervening distance.

As a result of this analysis it is possible to name the requirements which must be met by any method in which the reflections are to be carried over from one setup to the next. The instruments and shot holes must be in such a relation that (a) there are only relatively small distances between reflection points on any one bed, and (b) when changing from one shot hole to the next, there must be positive assurance that the reflections from the same bed can be definitely identified on the new records. The first condition has been discussed in the last paragraph. The second condition is connected with the first, and can also be easily demonstrated.

It might be considered possible to obtain a continuous survey of the bed shown in Figure 1, i. e., to close the gap between points $o$ and $a$, by moving the instruments after the region from $a$ to $b$ has been surveyed along the survey line to the left so that seismometer $S_{10}$ occupies the position formerly occupied by, say, $S_5$, digging a new shot hole a suitable distance from the new position of seismometer $S_1$, and taking a record. The reflection point from the new shot hole to the new position of $S_{10}$ would be near the point $a$, so that it would be assumed at first that the survey could be carried forward by this overlapping process. This is not true, however. It must be remembered that the only way that the reflection from that particular bed was carried forward from one instrument to the next was that the reflected wave appeared on the record from all the instruments at approximately the same time, i. e., the arrival times of the wave at the different instruments were nearly the same. When the position of shot hole and instruments is changed, the path of the reflected waves is also shifted. Thus, the path of a reflected wave from the new shot hole to the reflection point near $a$ to the new position of $S_{10}$ is much longer than either the path from shot hole A to $a$ to $S_1$ or from A to $b$ to $S_{10}$ in the original setup. For this reason, no arrival time of the wave reflected from this bed to the shifted instruments will be identical with the arrival time of the reflected wave from the same bed to any of the instruments in the original setup. This point is of extreme importance. It follows that positive identification of the reflection from record to record as the instrument setups are overlapped is impossible, due to this difference in arrival times of the reflected waves. One can assume with fair accuracy that certain reflections appearing at certain predicted points in the overlapping records are from the same stratum, but no assurance can be placed on the results obtained under such circumstances. Indeed, it has been proved by subsequent deep drilling in regions difficult to survey that the reflections were not carried over satisfactorily in this way.

Definite identification of the reflections from one bed can be made from one record to another taken after the instruments have been moved or the shot hole changed, if the shot holes and seismometers are so arranged that the distance from shot hole to one seismometer is substantially the same for both records and the reflection point on the bed is substantially the same. This insures that the wave will travel substantially the same distance in both cases before reaching this particular seismometer, so that the arrival time of this wave as read off both records will be substantially identical. Then in each record the reflection can be carried over from this particular seismometer to others placed so that a continuous survey can be made. This principle is new and has not been employed heretofore to the best of our knowledge. It forms the principal basis of our invention.

Figure 2:
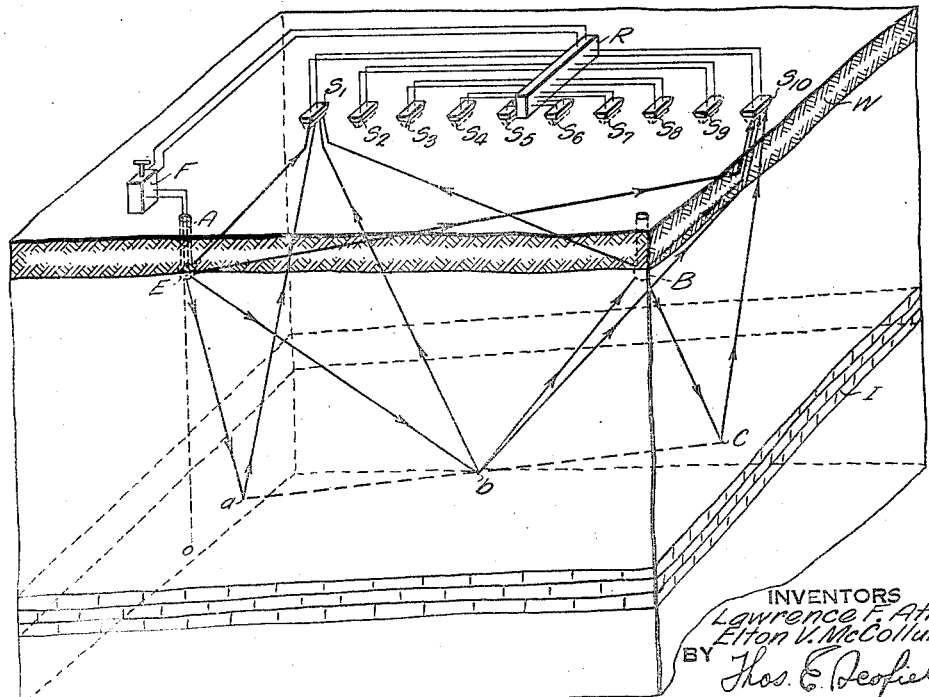
Figure 2 is an isometric diagrammatic view of the section shown in Figure 1, illustrating one arrangement of equipment and shot holes capable of carrying out the method of our invention.

This is best understood by reference to Figure 2 in which the same section of the earth's crust shown in Figure 1 is reproduced. Shot holes A and B are drilled on a line roughly parallel to the survey line and at a distance from it. The shot holes are preferably 1000 to 2000 feet apart and the survey line may be 100 to 300 feet from the shot hole line, although different distances may be employed at the will of the surveyor. The seismometers are placed on the survey line, the number and spacing depending upon the required accuracy of the survey. We prefer to use a spread of at least six seismometers. One seismometer is placed opposite each of the two shot holes. The instruments are preferably of the type producing electric impulses as a result of seismic disturbances, and are connected to a recorder R which may suitably contain a multi-channel amplifier and some sort of multi-element oscillograph. Records are made of the seismic disturbance along the line of instruments for a charge of explosive detonated in each shot hole. The instant of detonation of the explosive is impressed on each record by means already well known to the art.

Referring to Figure 2, assume the survey line to lie East-West, and the strike of the dipping bed to be N 45° E (worst possible strike angle). The distance from $S_1$ to $S_{10}$ is 1000 feet, and the line of shot holes is 200 feet from the seismometer line. The dip of the bed is assumed to be 30°, whch is a very steep dip, seldom encountered. The difference in lengths of the two reflecting paths A—$b$—$S_{10}$ and B—$b$—$S_1$ is only 25 feet when the bed is 1000 feet below the surface, and 5 feet when the bed is 5000 feet down. The time differences on the two records corresponding to these differences in length will depend on the seismic wave velocity. Assigning this a common value of 7000 feet per second, the time difference in the first case is only 0.0036 second and 0.0007 second in the second case. This demonstrates that even under such severe circumstances no difficulty would be encountered in correlating the two reflections indicated.

In the analysis given just above, one factor has been neglected. If the depth of the weathered zone beneath seismometers $S_1$ and $S_{10}$ is not the same, the travel time along path A—$b$—$S_{10}$ will be slightly different from travel time along path B—$b$—$S_1$, since the velocity of the seismic waves in this zone is much lower than in the consolidated beds. Thus a ten foot difference in the thickness of this zone, in which the velocity is usually found to be about 2000 feet per second, would cause a time difference in the two arrival times of $$10\left(\frac{1}{2000} - \frac{1}{7000}\right)$$

or 0.00357 second, in the example given. The removal of weathering error will be discussed more fully hereinafter.

In continuous surveying, the method is pursued as follows: A shot is detonated in hole A and a record is made of the resulting seismic waves at the seismometers $S_1$, $S_2$, $S_3$, $S_4$, $S_5$, $S_6$, $S_7$, $S_8$, $S_9$ and $S_{10}$. From this record the subsurface is surveyed for depth and dip from reflection point $a$ to reflection point $b$. Then, a shot is detonated in hole B, and a record produced. These two records are then compared carefully in order to find on the second record the reflections corresponding to those encountered on the first record. The comparison, of course, is between the trace of seismometer $S_{10}$ for the shot in hole A and the trace of seismometer $S_1$ for the shot in hole B. This correlates the two records and permits extending the survey of this same bed between reflection points $b$ and $c$. Now the seismometer spread is moved along the survey line until instrument $S_1$ is at the position formerly occupied by instrument $S_{10}$. The seismometers are now arranged to correspond with positions $S_{10}$—$S_{19}$ of Figure 3. Another shot is detonated in hole B, and a record made. On this record, the trace of seismometer $S_1$ in the new position $S_{10}$ will show the reflections identically at the same times as the trace of $S_{10}$ in the original position for the first shot at B, because the positions of the instruments are, of course, the same with reference to the shot hole, and the reflection points are identically placed at $c$. This correlates the new record, and the reflection points can be determined from $c$ to the right (Figures 2 and 3), just as originally points $a$ to $b$ were found. The next shot is at C in Figure 3 using seismometer positions $S_{10}$—$S_{19}$, then at C using seismometer positions $S_{19}$—$S_{28}$, then at D using seismometer positions $S_{19}$—$S_{28}$, etc. Each record can be correlated with the preceding one since there is always an identical wave path (B—$c$—$S_{10}$, C—$c'$—$S_{19}$, or D—$c''$—$S_{28}$) or a pair of equivalent wave paths (those through reflection points $b$, $b'$ and $b''$) which permit the identification on the records of reflections from the same bed. Thus, correlation of the records can be made each time the shot point or the line of seismometers is moved, giving continuous correlation surveying of the subsurface strata.

There are several alternative ways in which the same method of correlation can be used. Another which can be used is as follows: The line of seismometers is placed parallel to the line of shot holes, but the spread is arranged so that the first instrument is opposite one shot hole, the middle instrument is opposite the second shot hole and the last instrument is opposite the third shot hole. The arrangement can be described by reference once more to Figure 3. Using a spread of seismometers $S_1$—$S_{19}$, a charge of explosive is detonated in shot hole B opposite the middle seismometer, and records made in the usual manner. After all necessary records have been obtained, the instrument spread is moved along the survey line the distance between shot holes, so that the middle instrument occupies the position occupied formerly by one end seismometer. The spread now occupies positions $S_{10}$—$S_{28}$. Records are again taken for waves produced by detonation of an explosive charge in shot hole C. This process is repeated throughout the survey.

In correlating the records obtained using the various shot holes, the reflection record corresponding to a shot at B and reception at $S_{19}$ is compared with the reflection record for a shot at C and reception at $S_{10}$. It is evident by inspection of Figure 3 in light of the previous paragraphs that the reflection points on the various reflecting strata will be practically identical for reflected waves received at these stations from the holes mentioned. Moreover, wave path B—$b'$—$S_{19}$, as we have seen before, is substantially equal in length to wave path C—$b'$—$S_{10}$. This arrangement of instruments illustrates the fact that the location of the seismometers is not limited to the portion of the survey line lying between points opposite the two shot holes, but may be extended on either side. The connection of the seismometers illustrated to the amplifier-recorder is not shown in Figure 3, as the usual arrangement has been adequately illustrated in Figure 2.

While it is desirable that the lengths of reflected wave paths for the correlation traces be as nearly equal as possible and that the reflection points for the correlation traces be as nearly identical as possible it will be apparent that some latitude in these matters can be allowed without departing from the spirit of our invention. One of many possible examples of this is illustrated in Figures 4 and 5.

Figure 3:
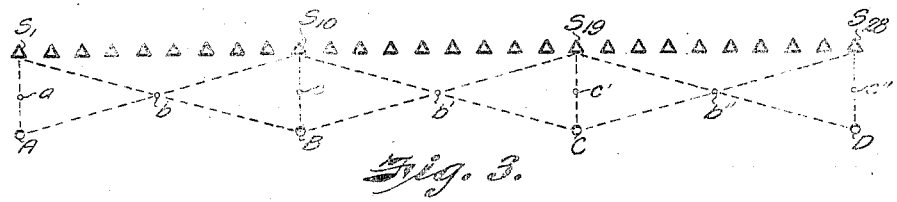
Figure 3 is a diagrammatic plan view showing one arrangement of seismometers and shot holes used in carrying out the method of our invention.
Figure 4:
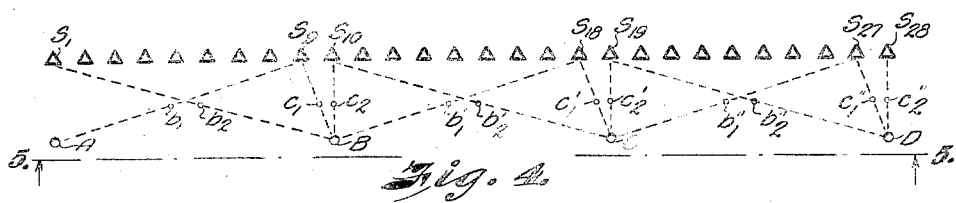
Figure 4 is a diagrammatic plan view similar to Figure 5 but illustrating a variation of our method.

Figure 4 corresponds to Figure 3 except that nine seismometers are used at a time instead of ten as preferred in the method of Figure 3. In operating in accordance with Figure 4, seismometers $S_1$—$S_9$ are used for shots at A and B, seismometers $S_{10}$—$S_{18}$ are used for shots at B and C, seismometers $S_{19}$—$S_{27}$ for shots at C and D, etc.

Figure 5:
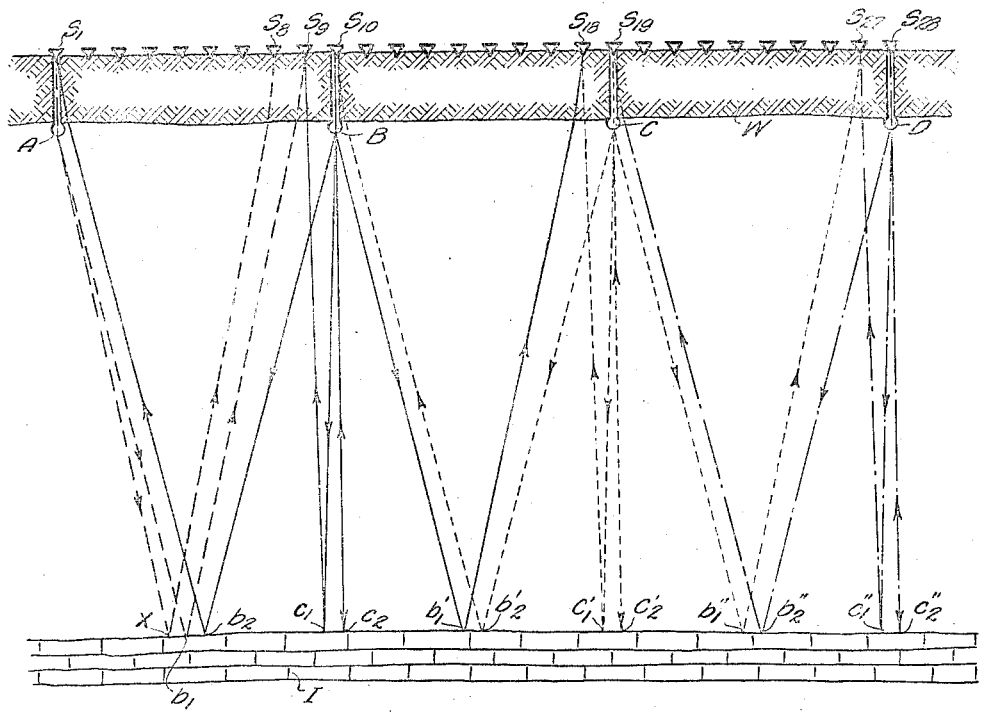
Figure 5 is a diagrammatic sectional view through the earth's crust taken along the line 5—5 of Figure 4.

The correlation wave paths are illustrated in Figures 4 and 5. Reflection point $b$ of Figure 3 becomes two slightly separated reflection points $b_1$ and $b_2$ in Figures 4 and 5. Similarly reflection point $c$ becomes $c_1$ and $c_2$, $b'$ becomes $b_1'$ and $b_2'$, $c'$ becomes $c_2'$, $b''$ becomes $b_1''$ and $b_2''$, $c''$ becomes $c_1''$ and $c_2''$, etc. The lengths of the correlation wave paths are likewise varied to some extent. However, the variation both as to reflection points and lengths of paths is so small that correlation is still possible and the advantages of our invention are, for the most part, preserved.

In general, it may be said that successive set-ups, or arrangements of shot hole and seismometers, should be so laid out that the length of reflected wave path corresponding to a reflection from a given underlying reflecting structure shown on one trace on a record made using one setup is substantially identical with the length of reflected wave path corresponding to a reflection structure shown on one trace on a second record made using the next setup and so that the reflection points on the underlying reflecting structure for the two reflected wave paths are not substantially further apart than the maximum spacing for reflection points on the same structure for wave paths corresponding to any two adjacent traces on either of the two records. Although with some slight sacrifice of accuracy, the reflection points for the correlation traces can be as much as twice the maximum spacing of reflection points for adjacent traces on a single record. Thus, for example, in Figures 4 and 5 wave paths B—$c_1$—$S_9$ and B—$c_2$—$S_{10}$ are substantially identical in length or in other words are so nearly the same length that the corresponding reflections on the correlation traces can be identified readily because they come in within a small fraction of a second of the same time interval after the firing of the respective shots. As an example of the reflection point requirement, reflection points $b_1$ and $b_2$ for the correlation traces (Figure 5) are not more than twice the spacing between reflection points $x$ and $b_1$ for adjacent traces on a single record.

Referring now to Figure 6, shot holes are drilled at $S_1$, $S_2$, $S_3$, and $S_4$ along the profile to be surveyed. They are of sufficient depth to penetrate the weathered layer W. The distance between shot holes is not critical and may be arranged from a few hundred feet to several thousand feet, depending upon field conditions and the number of seismophones used. The seismophones between shot point $S_1$ and $S_2$ are indicated as $R_1$, $R_2$, $R_3$, $R_4$, and $R_5$. These are connected to a suitable amplifying and recording system capable of giving individual traces for the impulses received at each seismometer. If desired, $R_1$, $R_2$, $R_3$, $R_4$, and $R_5$ may represent respective groups of seismometers, electrically connected to an individual oscillograph so that it will give the composite trace of the aggregate of impulses received by the groups of seismometers. The distance between individual seismometers is such that the reflections can normally be correlated from trace to trace across the record spread. Such distances are usually between 25 feet and 200 feet. $R_1$ and $R_5$ are placed substantially at shot holes $S_1$ and $S_2$. If a shot is recorded from $S_1$ with the seismometers as shown, reflections from points $M_1$, $M_2$, $M_3$, $M_4$, and $M_5$ on the reflected bed I will be recorded on the record strip. With the seismometers in the same position, a shot detonated in shot hole $S_2$ will induce seismic waves reflected from points $M_5$, $M_6$, $M_7$, $M_8$, and $M_9$. It will be noted that the records of both shots, that is, the one from $S_1$ and the one from $S_2$ carry reflections from a point closely adjacent $M_5$. The path of a seismic wave from $S_1M_5R_5$ is substantially the same as the path from $S_2M_5R_1$. This common path, or nearly common path, as has been heretofore pointed out, enables the ready correlation of two records made from shot points $S_1$ and $S_2$ respectively across points $M_1$ to $M_9$ inclusive on the reflecting bed.

The seismometers are next moved to positions $R_5$, $R_4'$, $R_3'$, $R_2'$, $R_1'$, between shot points $S_2$ and $S_3$, and records taken from shots at $S_2$ and $S_3$. This will give reflection points on the two records thus obtained at $M_9$, $M_{10}$, $M_{11}$, $M_{12}$, $M_{13}$, $M_{14}$, $M_{15}$, $M_{16}$, and $M_{17}$. Since path $S_2$—$M_{13}$—$R_1'$ is substantially identical with path $S_3$—$M_{13}$—$R_5$, the two records can be readily correlated. The seismometers are then moved to occupy positions $R_1'$, $R_2''$, $R_3''$, $R_4''$, and $R_5$. Shots are then recorded from shot holes $S_3$ and $S_4$ to obtain records of reflections from points $M_{17}$, $M_{18}$, $M_{19}$, $M_{20}$, and $M_{21}$, from the shot in shot hole $S_3$ and from points $M_{21}$, $M_{22}$, $M_{23}$, $M_{24}$, and $M_{25}$ from the shot in shot hole $S_4$. The two records can be correlated because the path $S_3$—$M_{21}$—$R_5'$ is substantially the same as the path from $S_4$—$M_{21}$—$R_1'$.

This process may be continued as described above to continuously trace any selected recorded reflection over an extended profile. The first arrival times of energy between $S_1$ and $R_1$, and $S_2$ and $R_5$, or the shot and the seismometer at the shot hole, gives weathering time correction at the near hole seismometer. In this manner, the depth of the reflecting bed can be readily computed at the points $M_1$, $M_5$, $M_9$, $M_{13}$, $M_{17}$, $M_{21}$ and $M_{25}$ along the profile. If desired, the dip slope may be computed between $M_1$ and $M_5$, $M_5$ and $M_9$, $M_9$ and $M_{13}$, $M_{13}$ and $M_{16}$, $M_{16}$ and $M_{21}$, and $M_{21}$ and $M_{25}$ to provide a continuous dip profile.

Another arrangement is shown in Figure 7. It will be noted that the setup of shot holes and seismometers is similar to that shown in Figure 6 and the same method of shooting is followed to provide records of continuously correlated sequence along the profile. It will be noted, however, that in Figure 7, seismometers $R_1$ and $R_5$, $R_1'$ and $R_5'$, and $R_1''$ and $R_5''$ are not positioned at the respective shot holes $S_1$, $S_2$, $S_3$, and $S_4$, but are removed a distance from the respective shot holes. The distance between the shot hole and the nearest seismometer $R_1$, $R_5$, $R_5'$ and the like is such that a major portion of the deleterious effects of shot point noise and disturbance described above is avoided. This distance in accordance with the embodiment of our method illustrated in Figure 7 may be between 50 and 200 feet, while the distance between the terminal seismometers $R_1$ and $R_5$ of a spread may be from 100 to 400 feet. It will be noted that the reflection paths $S_2$—$M$—$R_5$ and $S_2$—$N$—$R_1'$ are substantially equal as are the paths $S_1$—$F$—$R_5$ and $S_2$—$G$—$R_1$. Similarly, the reflection path $S_2$—$Q$—$R_5'$ is substantially equal to the path $S_3$—$P$—$R_1'$. Path $S_3$—$T$—$R_5'$ is substantially equal to path $S_3$—$U$—$R_1'$. Likewise, path $S_3$—$V$—$R_5''$ is substantially equal to path $S_4$—$W$—$R_1''$, enabling correlations of reflections to be made quite readily in a manner heretofore described.

Figure 8:
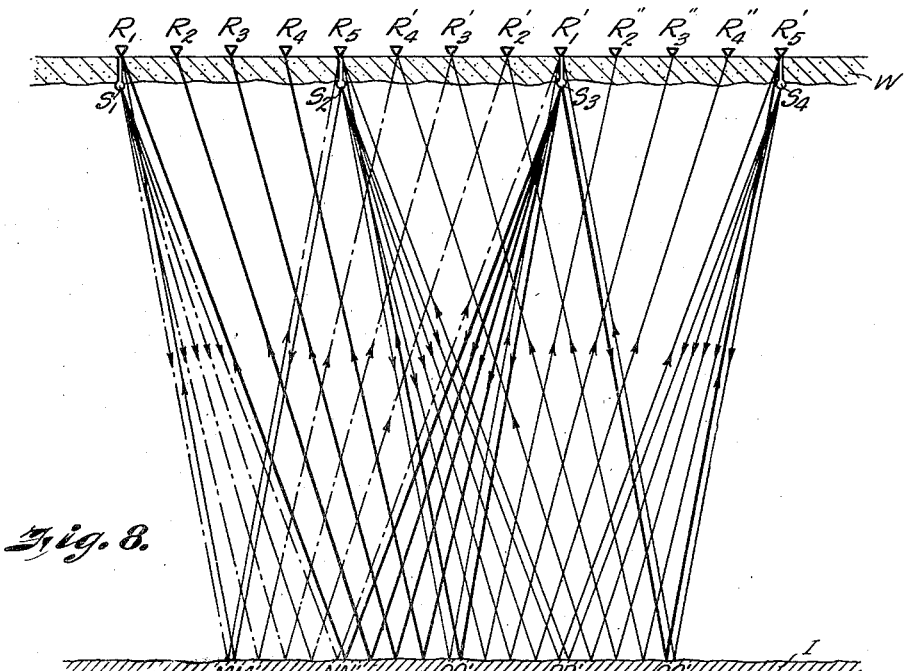
Figure 8 is another sectional view illustrating a method of carrying out our invention enabling the elimination of shot point disturbances.

Referring now to Figure 8, we have shown an arrangement which is particularly adaptable when shot point disturbances are large and clear cut reflections cannot be recorded near the shot point. As in previous examples, the shot point is located beneath the weathered zone W at points $S_1$, $S_2$, $S_3$ and $S_4$ respectively. Seismometers are placed at relatively close intervals, seismometers $R_1$, $R_2$, $R_3$, $R_4$ and $R_5$ being placed between shot holes $S_1$ and $S_2$, seismometers $R_5$, $R_4'$, $R_3'$, $R_2'$ and $R_1'$ being placed between $S_2$ and $S_3$, while seismometers $R_1'$, $R_2''$, $R_3''$, $R_4''$ and $R_5'$ are placed between shot holes $S_3$ and $S_4$. In the setup shown in Figure 8, the spread $R_1$, $R_2$, $R_3$, $R_4$, and $R_5$ is placed as positioned. A shot is fired from shot hole $S_3$. This records reflections from spaced points on the reflecting bed I from $O'$ to $N'$. The seismometers are then moved to occupy positions $R_5$, $R_4'$, $R_3'$, $R_2'$ and $R_1'$ and a shot is fired from shot hole $S_1$. This records reflections between points $M$ and $N$. Without moving the seismometers another shot is fired in shot hole $S_4$, recording reflections between points $Q'$ and $P'$. Then the seismometers are moved to occupy positions $R_1'$, $R_2''$, $R_3''$, $R_4''$ and $R_5'$. A shot is then fired in shot hole $S_2$ and reflections are obtained between points $O$ and $P$ on the reflecting bed I. Now it will be observed that the record carrying reflections from points $M$ to $N$ is readily correlatable with the record carrying reflections from $N'$ to $O'$ because the path $S_1$—$N$—$R_1'$ is substantially equal to the path $S_3$—$N'$—$R_1$. Similarly, the path $S_2$—$O$—$R_1'$ is substantially equal to the path $S_3$—$O'$—$R_5$. In a similar manner, it will be apparent that the path $S_2$—$P$—$R_5'$ is substantially the same as the path $S_4$—$P'$—$R_5$.

In the method just described, the nearest seismometer to the shot hole is removed the length of a spread from the shot hole, thus eliminating shot hole disturbances and yet enabling our method of continuous profiling to be carried out.

Figure 9:
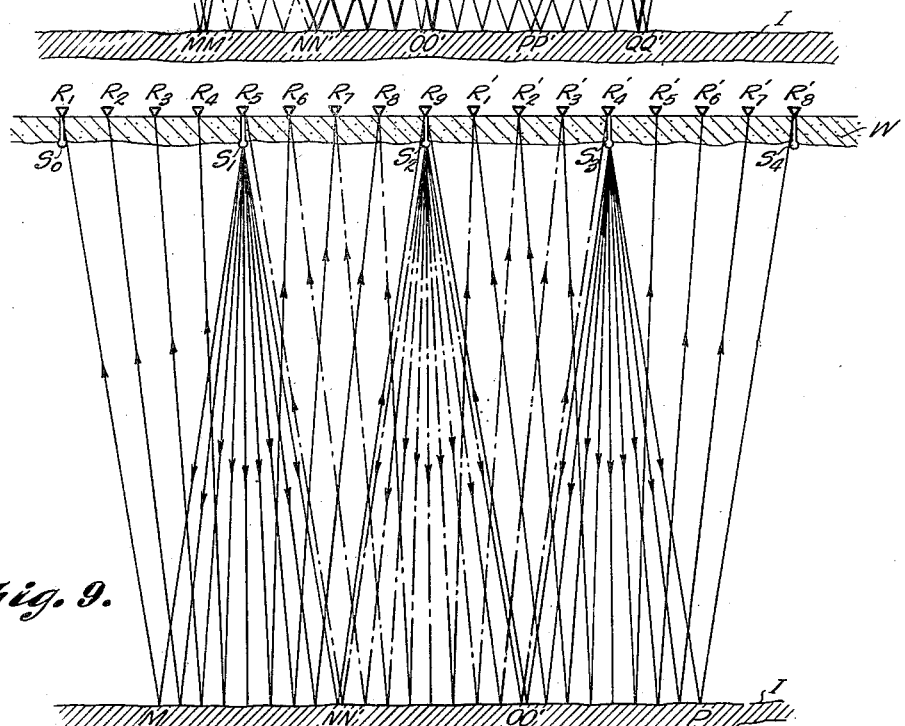
Figure 9 is another sectional view showing a modified arrangement of shot points and seismometers capable of carrying out another embodiment of the method of our invention.

Referring now to Figure 9, shot holes are drilled through the weathered layer W as before and are indicated at $S_0$, $S_1$, $S_2$, $S_3$ and $S_4$. The distances between shot holes need not be equal and may be any convenient distances. Seismometers are spread between shot holes $S_0$ and $S_2$ at points $R_1$, $R_2$, $R_3$, $R_4$, $R_5$, $R_6$, $R_7$, $R_8$ and $R_9$. A shot is fired in shot hole $S_1$ and reflections are recorded along the spread of seismometers from $R_1$ to $R_9$, which gives recorded reflections from points M to N upon the reflecting bed I. Seismometers $R_5$, $R_6$, $R_7$, $R_8$ and $R_9$ are left in position, while seismometers $R_1$, $R_2$, $R_3$, and $R_4$ are moved to the positions $R_1'$, $R_2'$, $R_3'$ and $R_4'$, thus providing a spread between shot hole $S_1$ and shot hole $S_3$. A shot is then fired in shot hole $S_2$, giving reflections between points N' and O upon the reflecting bed I. Seismometers $R_9$, $R_1'$, $R_2'$, $R_3'$ and $R_4'$ are left in position, while seismometers $R_5$, $R_6$, $R_7$ and $R_8$ are moved to occupy the positions shown at $R_5'$, $R_6'$, $R_7'$ and $R_8'$ upon Figure 9. A shot is then fired from shot hole $S_3$, the record giving traces of reflections between points O' and P upon the reflecting bed I. It will be obvious that reflections may be traced from point M to point P on the reflecting bed, enabling computation of depths or of a continuous profiling of dip slopes, since reflection path $S_1$—N—$R_9$ is substantially equal to reflection path $S_2$—N'—$R_5$, and reflection path $S_3$—O'—$R_9$ is substantially equal to reflection path $S_2$—O—$R_4'$.

Figure 10:
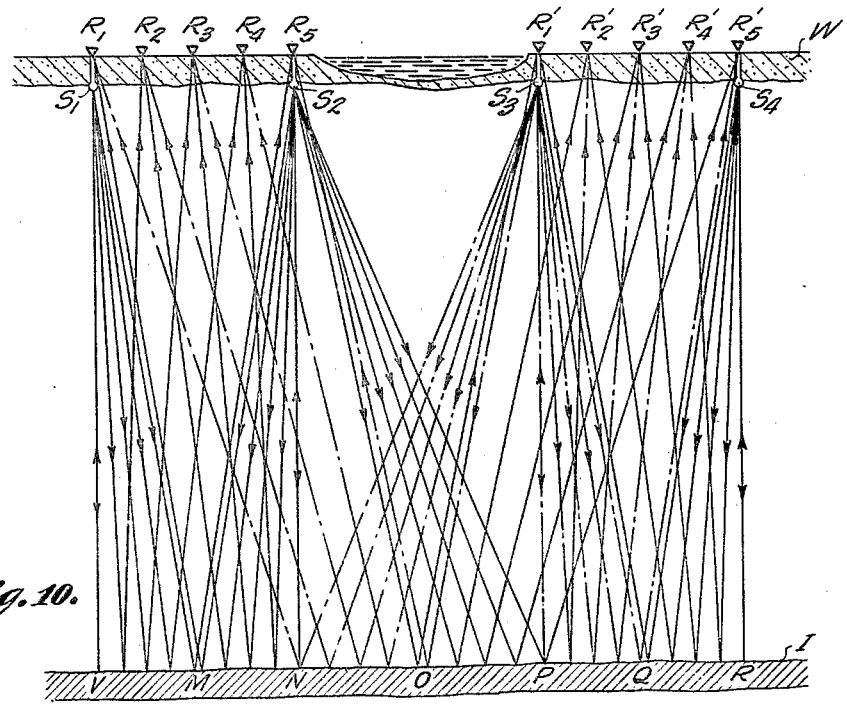
Figure 10 is a further sectional view of an arrangement of seismometers and shot points with indicated reflection paths in which alternating spreads are eliminated enabling us to bridge obstructions while carrying out our continuous profiling method.

Referring now to Figure 10, we show an arrangement enabling our method of continuous profiling to be carried out with an embodiment enabling the reduction of the number of seismometer spreads and also providing a method of continuously profiling where intervening obstructions exist over which a seismometer spread cannot be placed. As in previous cases, we drill shot holes $S_1$, $S_2$, $S_3$ and $S_4$ through the weathered layer W. A seismometer spread comprising seismometers $R_1$, $R_2$, $R_3$, $R_4$ and $R_5$ are placed between shot holes $S_1$ and $S_2$ with seismometers $R_1$ and $R_5$ substantially at shot holes $S_1$ and $S_2$ respectively. A shot is then fired from shot hole $S_1$. This gives reflections between points V and M upon reflecting bed I. Without moving the seismometers, a shot is then fired at shot point $S_2$. This gives reflections between points N and M on the reflecting bed I. A shot is then fired from shot point $S_3$. This gives reflections between points O and N on reflecting bed I. The seismometers are then moved to occupy positions $R_1'$, $R_2'$, $R_3'$, $R_4'$ and $R_5'$ between shot holes $S_3$ and $S_4$. A shot is then fired from shot point $S_2$. This gives reflections between points O and P on the reflecting bed I. A shot is then fired from shot hole $S_3$ without moving the spread. This gives reflections between points P and Q. With the spread still in the same position, a third shot is fired from shot point $S_4$ giving reflections between points Q and R on the reflecting bed I. It will be seen that the method of tracing reflections and correlating records from points V to N is the same in the mode of proceeding shown in Figure 10, as has been heretofore described. Path $S_1$—M—$R_5$ is substantially equal to path $S_2$—M—$R_1$. Similarly, no difficulty will be experienced in correlating reflections between points P and R upon the reflecting layer I. To correlate the record of the shot from shot hole $S_2$ received at seismometer $R_5$ with the record of the shot from shot hole $S_3$ received at seismometer $R_1'$, we compute the time of arrival of a reflection on the record obtained by shooting from shot hole $S_3$ along path $S_3$—N—$R_1$ which gives the depth to N previously determined from the reflection path $S_2$—N—$R_5$. Having identified the reflection which travels the path $S_3$—N—$R_1$ on the record which was shot from shot hole $S_3$ when the seismometers were spread between shot holes $S_1$ and $S_2$, we may trace this reflection across the record and the reflection time for path $S_3$—O—$R_5$ may be identified. It will be obvious that the path $S_3$—O—$R_5$ is substantially the same as path $S_2$—O—$R_1'$, so the reflection may be identified on the record which was shot from shot hole $S_2$ with the seismometer spread between shot holes $S_3$ and $S_4$. This enables us to compute the depth to P from the travel time $S_2$—P—$R_5'$. The travel time of the vertical reflection from $S_3$—P—$R_1'$ can be determined, giving us the identical depth to P heretofore obtained, thereby identifying the reflection on that record which was shot from shot point $S_3$ with the seismometer spread between shot holes $S_3$ and $S_4$. The reflection can be traced from point P to point R as heretofore described, since path $S_3$—Q—$R_1'$ is substantially equal to the path $S_4$—Q—$R_1'$. From the foregoing, it will be clear that the reflection may be traced between reflecting points V—M, M—N, N—O, O—P, P—Q, and Q—R, and the depth of these points or dips between consecutive points can be determined. Another novel feature of our invention is that dips and correlation along a continuous profile may be determined free of weathering errors.

Figure 11:
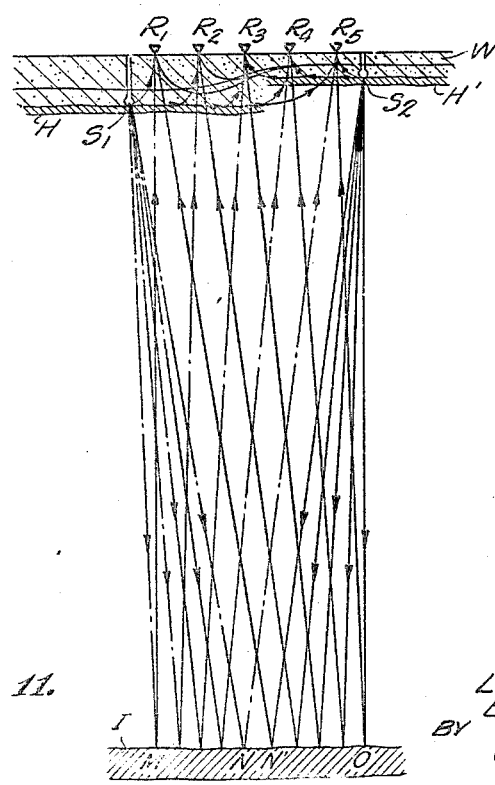
Figure 11 is a section through the earth's crust disclosing a method of determining weathering conditions.

Referring now to Figure 11, there is shown a conventionalized section of the earth's crust in which certain high speed beds occur which are discontinuous, showing a pair of shot holes $S_1$ and $S_2$ drilled through the weathered layer W with a spread of seismometers $R_1$, $R_2$, $R_3$, $R_4$ and $R_5$ therebetween, together with certain refraction and reflection paths of seismic waves from shots fired at shot points $S_1$ and $S_2$ respectively. It will be noted that, when a shot is fired at $S_1$, the first arrival at seismometer $R_1$ will be the seismic wave traveling through the weathered layer W from $S_1$ to $R_1$. The second arrival at $R_1$ will be the reflected wave traveling from $S_1$ to M to $R_1$. The first arrival at seismometer $R_2$ from the shot at shot point $S_1$ will be the refraction path from shot point $S_1$ along the high speed bed H. Similarly, the first arrivals at seismometers $R_3$, $R_4$ and $R_5$ will travel along the high speed bed H and then through the weathered layer to the respective seismometers. If the high speed beds H and H' were both continuous, it will be seen that the first arrivals or refraction paths at the respective seismometers will be along the high speed beds and then upwardly through the weathered layer. This would enable the thickness of the weathering to be determined. In practice, however, the high speed beds frequently are discontinuous, as shown in Figure 11. The travel times of the refractions from the respective shot points $S_1$ and $S_2$ to the respective seismometers $R_1$, $R_2$, $R_3$, $R_4$ and $R_5$ vary, partly because of the variable weathering and partly due to differences in the high speed portions of the paths so that it is impossible to determine weathering accurately by any solution of the refraction time paths. This is illustrated further by Figure 12 which is a section of the upper portion of the earth's crust in an area such as a river flood plane where weathering conditions are often quite erratic. Shot holes $S_1$ and $S_2$ are drilled below the weathered layer W, the explosives to be detonated being placed at the bottom of the shot holes in contact with the high speed bed H. Seismometers $R_1$ and $R_2$ are placed at two points intermediate the shot holes and refraction paths are indicated on the drawings. The arrangement is such that the distance between shot hole $S_1$ and seismometer $R_1$ is substantially equal to the distance between shot hole $S_2$ and seismometer $R_2$ and are sufficiently great that the first arrivals at seismometers $R_1$ and $R_2$ from either of the seismic wave sources shall have traveled at least part of their paths in the high speed or unweathered layer H before being refracted through the weathered layer W. In the prior art, it is common practice to assume that, since the distance between seismometer $R_1$ and shot hole $S_1$ is equal to the distance between seismometer $R_2$ and shot hole $S_2$, that the distance of the path from seismic wave source $E_1$ to point 1 along the high speed bed H is equal to the distance from the seismic wave source $E_2$ along high speed path to point 2 and therefore that the difference in travel time along path $E_1$—1—$R_1$ and path $E_2$—2—$R_2$ will be a true index of the weathering difference between seismophones $R_1$ and $R_2$. Sometimes, in the prior art, the difference in travel times along path $E_1$—3—$R_2$ and path $E_2$—4—$R_1$ has been employed to determine weathering conditions on the assumption that the distance between $E_2$ and 4 will be equal in time to the distance between $E_1$ and point 3.

By reference to Figures 11 and 12, it will be seen that these assumptions are not accurate in regions of erratic weathering. In Figure 11, it will be seen that the high speed paths along bed H of a shot from $S_1$ are longer than the high speed paths along the discontinuous portion H' of the high speed bed of a shot from shot point $S_2$.

In Figure 12, it will be noted that the distance between $E_1$ and 1 is quite different than the distance between $E_2$ and point 2. Likewise, the distance from $E_2$ to point 4 is different than the distance between $E_1$ and point 3.

Another quite erratic weathering condition is found in arid and semi-arid areas where caliche, which within itself is quite variable in physical qualities, is found heterogeneously interbedded with loose sands and clays near the surface of the earth. The shallow refraction paths do not always choose the same caliche stringers during their travel to the various seismophones. Furthermore, even if similar paths were taken by the seismic waves, the velocity of seismic wave travel in caliche varies through wide limits.

Referring again to Figure 11, reflection paths between shot points $S_1$ and $S_2$ are shown. The time path of the reflection from shot hole $S_1$ along the path $S_1$—M—$R_1$ and the time of seismic wave travel along path $S_2$—N'—$R_1$ may be used in calculating dip or datum difference between points M and N on reflecting layer I, free from weathering error. Similarly, the times of travel along paths $S_1$—N—$R_5$ and $S_2$—O—$R_5$ may be used in calculating the dip or datum difference between N and O. That weathering is eliminated in each dip computation will be apparent when it is considered that substantially the same weathering in the region of seismometer $R_1$ is included in path $S_1$—N—$R_1$ and path $S_2$—N'—$R_1$. Similarly, the same weathering is included in path $S_1$—N—$R_5$ and path $S_2$—O—$R_5$. This method of eliminating weathering errors may be used in computing dips or datum differences between any two reflecting points along the profiles shown in Figures 6, 7, 8 and 9, provided the reflecting points occur on two reflection paths between two shot points spaced below weathering and one common seismophone and provided, further, the individual reflections along the two paths can be correlated. It will be clear that correlation may be obtained in our method because the seismometers are so spaced with respect to shot points that each pair of records has certain traces from reflection paths which are substantially the same or sufficiently similar to permit ready correlation.

Referring now to Figure 13, we disclose two sources of seismic energy located beneath the weathered layer W at A and B in contact with consolidated rock layer G. A seismophone C is positioned at an arbitrary point on the earth's surface, removed a distance $d$ from a line drawn between shot points A and B. The position of this point may depend upon shot point disturbances, the frequency of near surface seismic waves or other disturbing factors, and is located to clearly receive reflections free of disturbances. A shot is fired at shot point A, creating seismic waves which will travel along path A—E—$e$—C, the time of travel being recorded in a manner known to the art, preferably upon photographic recording equipment or the like. Similarly, we cause seismic waves to be generated at point B and record the travel time along path B—F—$f$—C Points E and F are reflecting points upon the surface of bed H, which is a material differing in physical qualities from the material G so that some of the seismic waves will be reflected when they strike the interface between rock layer G and rock layer H. It will be noted that the time taken for the passage of seismic waves through the distance $eC$ is substantially the same as the time of travel through the distance $fC$ so that we may write the following equation:

$$t_{AEeC} - t_{BFfC} = t_{AEe} - t_{BFf} \qquad (1)$$

We thus arrive at an increment of time which may be used together with the velocity of sound waves through material G, the time of passage through the material G and the geometry of the setup to determine the component of dip between the points E and F on the reflecting layer, independent of the time of travel through the weathered layer W.

We have assumed that one may readily correlate the times required for seismic waves to traverse paths AEeC and BFfC although they are taken from different shots, but no difficulty is ordinarily encountered in this operation providing the spacing between A and B is not too great. We do not wish to place a limit on the distance between A and B as it will vary according to the area being surveyed. The offset distance $d$, which is the perpendicular distance from C to the line connecting A and B, may vary through wide limits. Ordinarily we prefer that $d$ be of the order of 100 feet to 1000 feet but under extreme conditions where waves of low frequency and low velocity traveling near the surface of the earth interfere we find distances ranging to several thousand feet sometimes preferable and desirable. It might be thought that a large value of $d$ would inject considerable error into the determination of dip between points E and F but this is not true as may be shown mathematically.

In Figure 13 we have shown the seismometer position C to be offset at a distance $d$ from the line A and B and intermediate points A and B. However, in cases where a stream is between A and B we find it advantageous to place the seismometer at a point such as C'. It is obvious that other physical obstacles occurring in the general zone between A and B will also make it desirable to place the seismometer at C'. We do not wish to restrict the location of the seismometer relative to the two shot points as it will be obvious to those versed in the art that our invention will not only enable dip determinations to be made free of weathering errors but also unusual physical handicaps often encountered in field work may be surmounted by adaptations of our method.

In Figure 13 we have shown a flexible setup consisting of two sound sources and one seismograph that is capable of furnishing data necessary and sufficient to calculate one dip component that is free from errors introduced by the weathered layer near the earth's surface and errors that may be introduced by shot point disturbances or low frequency waves traveling near the earth's surface. It is obvious that by combinations of our method dip and strike may be determined. Furthermore, by the proper combination of a number of the setups shown in Figure 13 it is possible to effectively carry one or more markers continuously along a line or throughout an area.

In Figure 14 we show an areal view of three sound sources $S_1$, $S_2$, and $S_3$ and a seismograph $R_1$ such that data may be observed that is sufficient for the calculation of dip and strike that is free from errors resulting from heterogeneities in the weathered layer, shot point noises, and low frequency low velocity waves traveling near the surface of the earth. Seismic waves are created at $S_1$, $S_2$ and $S_3$ in turn and the times taken for passage through reflection paths such as described in Figure 13 are recorded by means of the seismometer $R_1$ and proper auxiliary equipment. Obviously any two of the shot points $S_1$, $S_2$ and $S_3$ together with the seismometer $R_1$ constitute the arrangement shown in Figure 13. We have shown $R_1$ as being located preferably within the triangular area $S_1$—$S_2$—$S_3$, the corners of which are in $S_1$, $S_2$, and $S_3$ but we sometimes find it advantageous to place $R_1$ outside of the area $S_1$, $S_2$, $S_3$, depending upon the area being surveyed.

Referring now to Figure 2, the shot points E and B and the two seismophones $S_1$ and $S_{10}$ are located substantially at the corners of a rectangle. It is to be understood that the two sound sources and the two seismographs may be positioned at the corners of a quadrilateral which is not necessarily a rectangle, without departing from the spirit of our invention. In cases where the reflecting layers have only moderate dip, many forms of quadrilaterals or polygons may be chosen, such that correlation or identification of reflections may be readily accomplished.

Referring again to Figure 13, we may use a seismometer placed at point P and one placed at point Q in addition to the one at point C. We cause seismic waves to be created at A and record on a common record strip the time taken for passage through the distance AP, which occurs on the record as a first arrival, the reflection path AEeC and the reflection path AIBQ. In a similar manner we then cause seismic waves to originate at B and record on another common record strip the times taken from passage through the distance BQ, the reflection path BFfC and the reflection path BIAP. Since the path AIB is substantially duplicated on both shots we may derive a time increment that is substantially independent of correlation and which is substantially free from errors commonly injected by heterogeneities in the weathered layer and which has the advantages caused by offsetting from the respective shot holes.

Let the time difference between the reflection paths AIBQ and AEeC be denoted by $\Delta t_A$. Then, $$\Delta t_A = t_{AIBQ} - t_{AEeC} \quad (2)$$

Similarly, $$\Delta t_B = t_{BIAP} - t_{BFfC} \quad (3)$$

Subtracting (3) from (2) gives, $$\Delta t_A - \Delta t_B = t_{AIB} + t_{BQ} - t_{AEe} - t_{eC} - t_{BIA} - t_{AP} + t_{BFf} + t_{fC} \quad (4)$$

As pointed out above $t_{eC}$ is substantially equal to $t_{fC}$. Obviously $t_{AIB} = t_{BIA}$ so that $$\Delta t_A - \Delta t_B = (t_{BQ} - t_{AP}) + (t_{BFf} - t_{AEe}) \quad (5)$$

Therefore, $$t_{AEe} = t_{BFf} + (t_{BQ} - t_{AP}) - (\Delta t_A - \Delta t_B) \quad (6)$$

Equation 6 gives the time difference $$(t_{AEe} - t_{BFf})$$

that is necessary for calculation of the dip between points E and F of Figure 13. In practice the time increment derived by Equation 6 is equally valid as that derived by Equation 1 and if preferred may be substituted therefor when making surveys in areas where reflecting beds are continuous. In case of very severe change in sedimentation we often prefer to take average values of $\Delta t_A$ and $\Delta t_B$ for several reflections ranging over a time interval equivalent to several hundred feet of geological section. Experience has confirmed that this practice at times aids in offsetting the severe lateral changes that often occur in sedimentation.

Referring again to Figure 2, two additional seismometers may be placed at the surface of shot holes A and B. The combination of the two sound sources E and B together with the detectors and additional seismometers will enable us to compute dip independent of weathering errors in a manner described in connection with Figure 13. It is to be remembered that, in each of the variations of our method heretofore described, we contemplate placing, if desired, an additional seismometer at the shot point which may be used solely to record direct wave travel times as first arrivals for use for weathering corrections only, because shot point disturbances would normally prevent the seismometer from recording interpretable reflections.

In continuously profiling, using line spreads only, a line on the reflecting interface is obtained. If the line for example happens to be at right angles to the direction of slope, it will appear to have no slope. If the line is along the direction of slope, it will give the true slope. At angles between the direction of slope and a direction at right angles to the direction of slope, only one vector of the true slope will be obtained. This frequently presents an erroneous picture.

According to another embodiment of the method of our invention, we may survey by seismic reflection methods around a closed traverse in such a manner as to trace a given reflection entirely around the traverse and thus correlate records.

Figure 15:
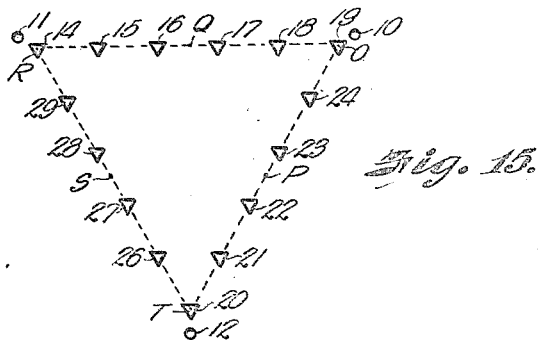
Figure 15 is a plan view of a polygonal arrangement of seismometers and shot holes capable of carrying out the method of our invention.
Figure 16:
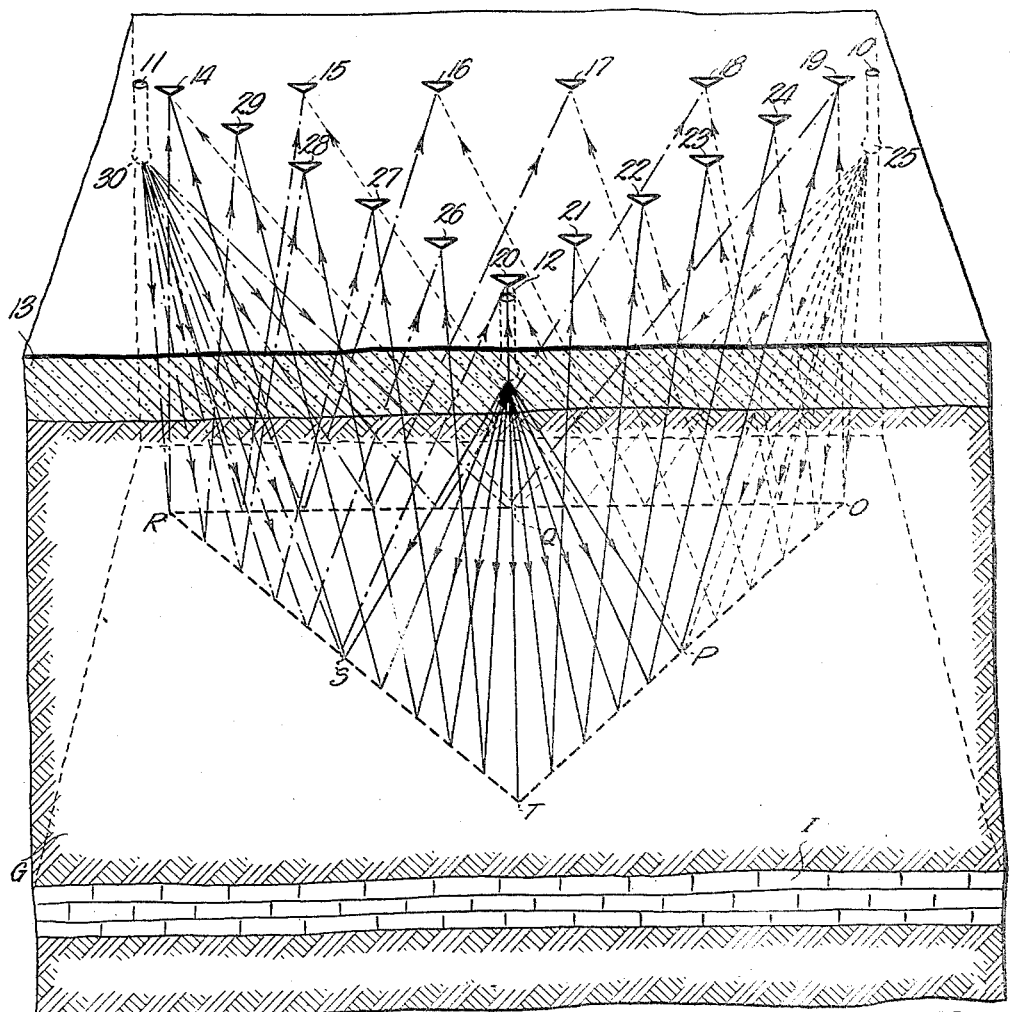
Figure 16 is a diagrammatic perspective view of a section of the earth's crust showing the shot hole and receiving point arrangement of Figure 15 and certain reflection paths.

Referring now to Figures 15 and 16, we drill three shot holes 10, 11 and 12 below the weathered layer 13. Between shot holes 10 and 11 we place seismophones 14, 15, 16, 17, 18, and 19. Between the shot holes 10 and 12 we place seismophones 19, 20, 21, 22, 23, and 24. A shot is then fired from the point 25 at the bottom of shot hole 10 and reflected energy received by the seismophones 14, 15, 16, 17, 18, and 19, as well as by the seismophones 20, 21, 22, 23, 24, and 19 of the spread between shot holes 10 and 12. The spread between shot holes 10 and 12 will give reflections from the interface of the reflecting layer I between points O and P, while the spread between shot holes 10 and 11 will give reflections along the line O—Q. We also place a spread of seismophones 26, 27, 28 and 29 between seismophones 14 and 20, thus completing a spread of seismophones between shot holes 11 and 12. A shot is then fired from point 30 at the bottom of shot hole 11. The line of seismometers comprising seismometers 14, 15, 16, 17, 18, and 19 between shot holes 10 and 11 will receive reflections along the line R—Q. The line of seismophones between shot holes 11 and 12 comprising seismophones 14, 29, 28, 27, 26, and 20 will receive reflections between points R and S. A shot is then fired from the bottom of a shot hole 12. The spread of seismophones between shot holes 11 and 12 will receive reflections along the line S—T on the reflecting surface as can readily be seen by reference to Figure 16. Similarly, the seismophone spread between shot holes 10 and 12 will receive reflections along the line T—P on the reflecting interface surface between rock layers G and I as can readily be seen by reference to Figure 16.

It will be noted that the length of the path of seismic waves from the bottom of shot hole 10 to point P on the interface to seismophone 20 is substantially equal to the length of the path from the bottom of shot hole 12 to point P to seismophone 19. Similarly, the path 25—Q—14 is substantially of the same length as the path 30—Q—19. The length of the path 30—S—20 is substantially the same as the path from the bottom of shot hole 12 to point S to seismophone 14. From what has been described hereinabove, it will be clear that the various record strips around the polygonal spread may be correlated.

Figures 17 and 18 illustrate another method of carrying out an embodiment of our invention, with the spread shown in Figure 15. The spread, it will be noted, is identical, there being three shot holes 10, 11, and 12. Between shot holes 10 and 11 we place seismophones 19, 18, 17, 16, 15, and 14, while seismophones 14, 29, 28, 27, 26, and 20 are between shot holes 11 and 12. Seismophones 20, 21, 22, 23, 24 and 19 are between shot holes 12 and 10. A shot is then fired at shot hole 11 and received along the spread comprising seismophones 20, 21, 22, 23, 24, and 19. This will give reflections along the line X—Y of the interface. A shot is then fired from the bottom of shot hole 10 and received by seismophones 20, 26, 27, 28, 29, and 14, between the shot holes 11 and 12. This will give reflections along the line Y—Z on the interface, between layer I and layer G. A shot is then fired from the bottom of shot hole 12 and received by the spread of seismophones 14, 15, 16, 17, 18 and 19, lying between shot holes 11 and 10. This will give reflections on the interface between the points X—Z. It will be noted that the path 10—Y—14 is substantially the same as the seismic wave path 11—Y—19. Similarly, the path 10—Z—20 is substantially the same as seismic wave path 12—Z—19. It will be noted that, in a like manner, reflection path 12—X—14 is substantially the same as seismic wave path 11—X—20. The presence of identical reflection paths on various records enables a ready correlation to be made, as pointed out hereinabove.

Figure 19:
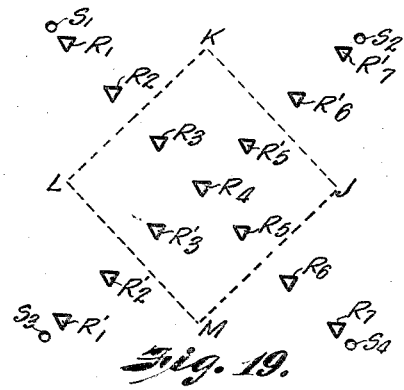
Figure 19 is a plan view of an arrangement of shot holes and seismometers capable of carrying out another embodiment of our invention.
Figure 20:
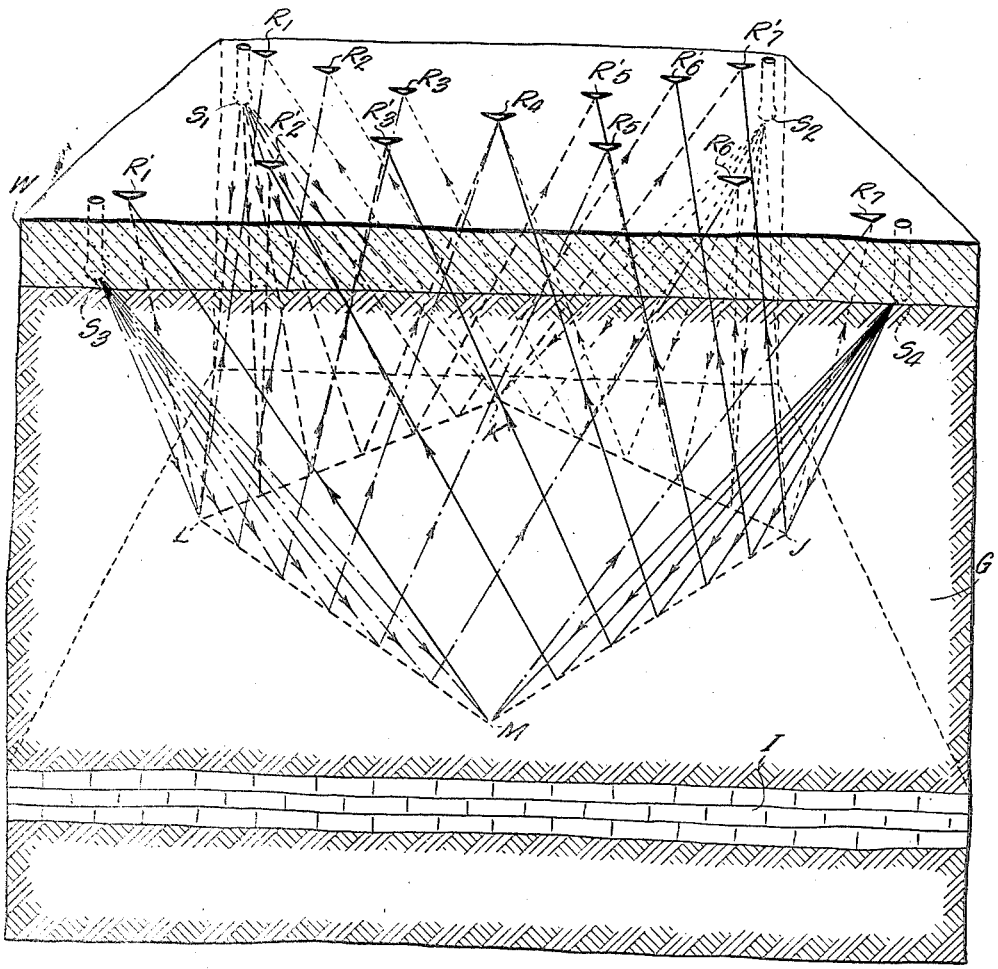
Figure 20 is a diagrammatic, perspective view of a section of the earth's crust showing the arrangement of shot holes and seismometers of Figure 19 and illustrating certain paths of seismic waves occurring in carrying out this embodiment of our invention.

Referring now to Figures 19 and 20, we drill four shot holes at the corners of a rectangle which may be, as shown, a square. It is to be understood that any polygon having an even number of sides may be used in carrying out the embodiment which will now be described. The four shot holes are indicated in Figure 19 as $S_1$, $S_2$, $S_3$ and $S_4$. We place a spread of seismophones $R_1$, $R_2$, $R_3$, $R_4$, $R_5$, $R_6$ and $R_7$ between the shot holes $S_1$ and $S_4$, that is, along what would be a diagonal of the figure formed by joining the shot holes. The shot holes are drilled beneath the weathered layer W as before. A shot is then fired from shot point $S_2$ and received by the spread $R_1$, $R_2$, $R_3$, $R_4$, $R_5$, $R_6$ and $R_7$, lying between shot holes $S_1$ and $S_4$. The reflected waves received by the spread come from between points J and K on the interface between rock layer G and rock layer I. Without moving the spread, we fire a shot from shot point $S_3$ and receive reflections by the same spread. These reflections will be those coming from between points L and M on the interface, as can readily be seen by reference to Figure 20. The spread of seismophones is then moved to occupy the positions $R_1'$, $R_2'$, $R_3'$, $R_4$, $R_5'$, $R_6'$ and $R_7'$. A shot is then fired from shot point $S_1$ giving a record of reflections on the interface lying between the line L and K. With the seismophones in the same position, a shot is then fired from the shot point $S_4$. The reflections received by the line of seismometers between shot points $S_2$ and $S_3$ will be those coming from between points J and M on the reflecting interface.

By reference to Figure 20, it will be readily noted that the path $S_4$—J—$R_7'$ is substantially the same length as the path $S_2$—J—$R_7$. Likewise, it will be noted that the path $S_4$—M—$R_1'$ is substantially the same as the path $S_3$—M—$R_7$. In a like manner, it will be readily seen that the path $S_3$—L—$R_1$ is the equivalent of path $S_1$—L$R_1'$. It will be noted, further, that the path $S_1$—K—$R_7'$ is of substantially the same length as the path $S_2$—K—$R_1$. The inclusion in the various record strips of a common reflection from one to the other enables correlation from one to the other to be made. It will be further obvious that the depths to the reflecting horizon can be computed as may also the direction and rate of dip between the shot points. It will also be noted from what has been described hereinabove that accurate weathering corrections are made available by the positioning of the seismophones.

Figure 21:
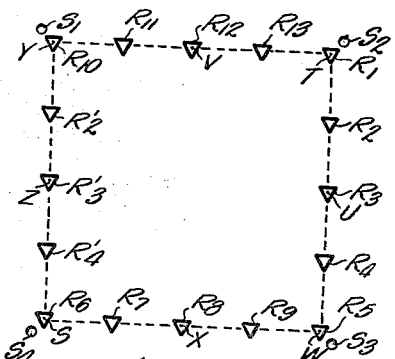
Figure 21 is a plan view of another polygonal spread capable of carrying out the method of our invention.
Figure 22:
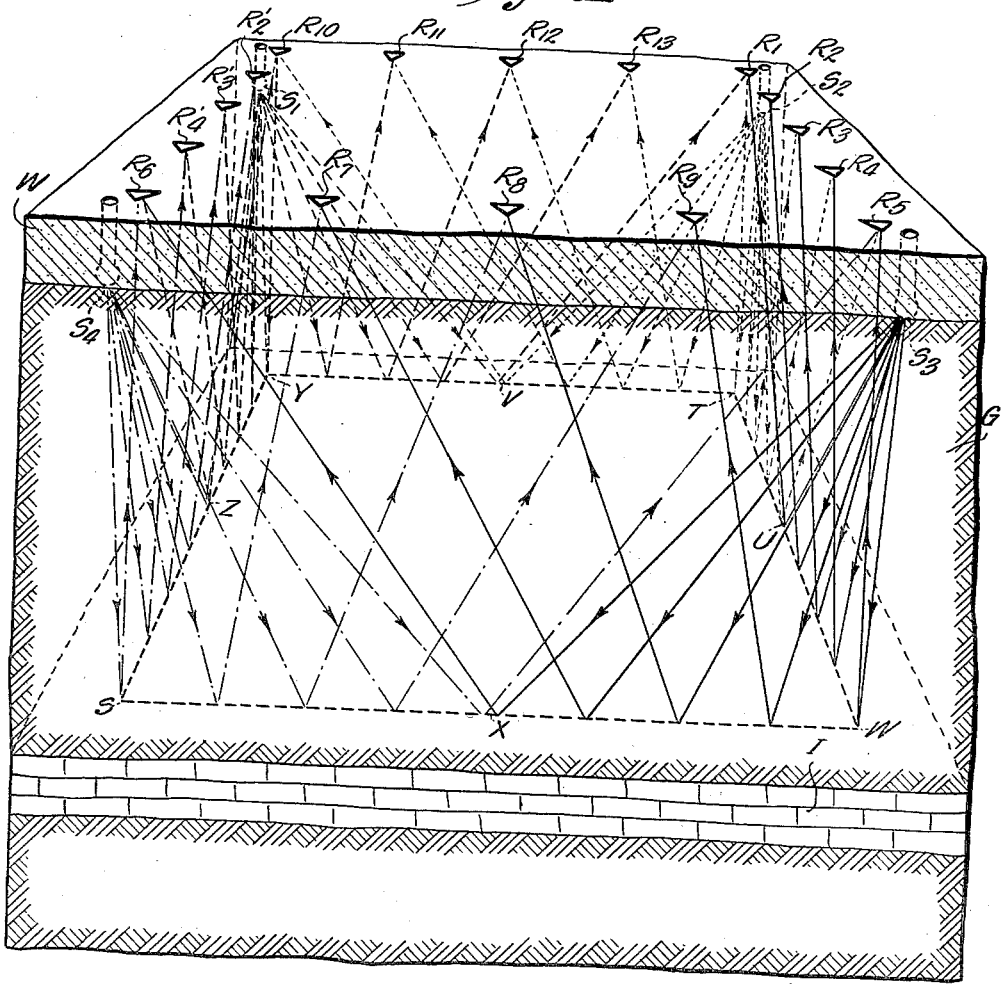
Figure 22 is a diagrammatic perspective view of a section of the earth's crust showing the arrangement of shot holes and seismometers of Figure 21 and indicating certain paths of seismic waves from shot holes to seismometers.

Referring now to Figures 21 and 22, we have shown another mode of proceeding in accordance with our invention, using a polygonal spread. In Figure 21, we employ four shot holes $S_1$, $S_2$, $S_3$ and $S_4$. Between the shot holes $S_2$ and $S_3$ we place spreads of seismophones $R_1$, $R_2$, $R_3$, $R_4$ and $R_5$. Between shot holes $S_4$ and $S_3$ we place seismophones $R_6$, $R_7$, $R_8$, $R_9$ and $R_5$. Between shot holes $S_1$ and $S_2$ we place seismophones $R_{10}$, $R_{11}$, $R_{12}$, $R_{13}$ and $R_1$. We generate seismic waves by detonating an explosive at $S_2$. The spread of seismophones comprising $R_1$, $R_2$, $R_3$, $R_4$ and $R_5$ between shot holes $S_2$ and $S_3$ will receive reflections between points T and U on the interface between layer I and layer G. The spread of seismophones comprising seismophones $R_{10}$, $R_{11}$, $R_{12}$, $R_{13}$ and $R_1$ will receive reflections from the reflecting interface between points extending thereon from T to V as can readily be seen by reference to Figure 22. A shot is then fired from the bottom of shot hole $S_3$. The spread between shot holes $S_2$ and $S_3$ comprising seismophones $R_1$, $R_2$, $R_3$, $R_4$ and $R_5$ will receive reflections between points U and W on the reflecting interface. The spread between shot holes $S_3$ and $S_4$ comprising seismophones $R_5$, $R_9$, $R_8$, $R_7$, and $R_6$ will receive reflections from points lying between points W and X on the reflecting interface. The line of seismophones $R_2$, $R_3$ and $R_4$ are then moved to occupy positions $R_2'$, $R_3'$ and $R_4'$, completing the spread between shot holes $S_1$ and $S_4$. The spreads between shot holes $S_1$ and $S_2$, and between $S_4$ and $S_3$ are allowed to remain in position. A shot is then fired from the bottom of shot hole $S_1$. The line of seismophones comprising seismophones $R_{10}$, $R_{11}$, $R_{12}$, $R_{13}$ and $R_1$ will receive reflections from the interface along the line Y—V, while the seismophones between shot points $S_1$ and $S_4$ will receive reflections between points Y and Z on the interface. A shot is then fired from the bottom of shot hole $S_4$ and received by the spreads lying between shot holes $S_1$ and $S_4$ and between $S_4$ and $S_3$. The spread between $S_1$ and $S_4$ will give a record of reflections between points Z and S, while the spread between shot holes $S_4$ and $S_3$ will give reflections between points S and X on the reflecting interface, as will readily be seen by reference to Figure 22.

It will also be readily observed that the path $S_3$—X—$R_6$ is the equivalent of path $S_4$—X—$R_5$; that path $S_3$—U—$R_1$ is the equivalent of path $S_2$—U—$R_5$; that path $S_2$—V—$R_{10}$ is the equivalent of path $S_1$—V—$R_1$; and that path $S_1$—Z—$R_6$ is the equivalent of path $S_4$—Z—$R_{10}$. The inclusion upon successive record strips of common paths enables the tracing of the common reflection from record strip to record strip and the ready correlation of successive records in a manner according to our invention, heretofore more fully described.

Figure 23:
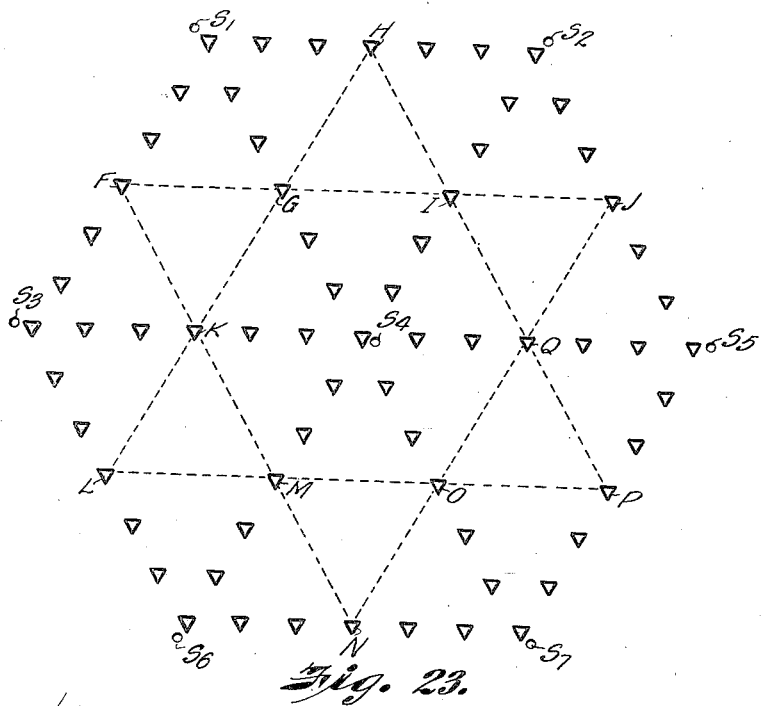
Figure 23 is a plan view of an arrangement of seismometers and shot holes showing a plurality of polygonal spreads over a flat subsurface bed.

It will be readily understood that combinations of polygonal shot point spacing may be employed to cover an entire large area in close detail. An example of such spacing extending the method shown in Figures 17 and 18 over a considerable area appears in Figure 23. The spread of seismophones and shot points is shown over a flat area for purposes of convenience. Shot holes $S_1$, $S_2$, $S_3$, $S_4$, $S_5$, $S_6$, and $S_7$ are drilled in the manner heretofore described and seismophone spreads are positioned between shot holes as can readily be seen by reference to the figure. A shot is fired at shot point $S_1$ and received by the line of seismophones extending between shot points $S_3$ and $S_4$ to give reflections along the line F—G. The shot at $S_1$ is also received by the line of seismophones extending between shot holes $S_2$ and $S_4$, giving reflections along the line G—H. A shot is then fired from shot point $S_2$ and received by the spread of seismophones lying between shot points $S_4$ and $S_5$, giving reflections along the line I—J. The shot at $S_2$ is also received by the line of seismophones lying between shot points $S_1$ and $S_4$, giving reflections along the line I—H. A shot is then fired at shot point $S_3$ and received by the line of seismophones lying between shot points $S_1$ and $S_4$, giving reflections along the line F—K on the reflecting interface of the subsurface stratum. The shot at $S_3$ is also received by the line of seismophones lying between $S_4$ and $S_6$, giving reflections along the line K—L. A shot is then fired at shot point $S_6$ and received by the line of seismophones lying between shot points $S_3$ and $S_4$ to give reflections along the line L—M. The shot at $S_6$ is also received by the line of seismophones lying between shot points $S_4$ and $S_7$, giving reflections along the line M—N. A shot is then fired at shot point $S_7$ and received by the line of seismophones lying between shot points $S_4$ and $S_6$ to give reflections along the line N—O. The shot at $S_7$ is also received by the line of seismophones lying between shot points $S_4$ and $S_5$ to give reflections between the points O and P on the reflecting interface. A shot is then fired at shot point $S_5$ and received by the line of seismophones lying between shot point $S_4$ and $S_7$ to give reflections received from the reflecting interface along the line P—Q. The shot at $S_5$ is also received by the seismophones lying between shot points $S_2$ and $S_4$ to give reflections along the line J—Q on the reflecting interface. A shot is then fired at shot point $S_4$. It is received by the line of seismophones between $S_1$ and $S_2$ to give reflections between points G and I on the reflecting interface. This shot is also received by the seismophones lying between shot points $S_2$ and $S_5$ to give a record of reflections from the interface between points I and Q. The record made by seismophones lying between shot points $S_5$ and $S_7$ of the shot at $S_4$ will give reflections from a line on the interface O—Q. The shot at $S_4$ will also be received by the line of seismophones lying between shot points $S_6$ and $S_7$ to give a record of reflections between points M and O on the interface. The shot at $S_4$ will also be received by the line of seismophones lying between $S_3$ and $S_6$. This, as will readily be observed, will give a record of reflected waves between the points K and M on the reflecting interface. The shot at $S_4$, too, will be received and recorded by the line of seismophones lying between shot points $S_1$ and $S_3$. This will give a record of reflected waves from points on the interface lying between G and K.

Correlation can readily be made due to the many common paths existing in the arrangement described, as will readily be understood from the description of the method heretofore made with respect to Figures 17 and 18.

Figure 24:
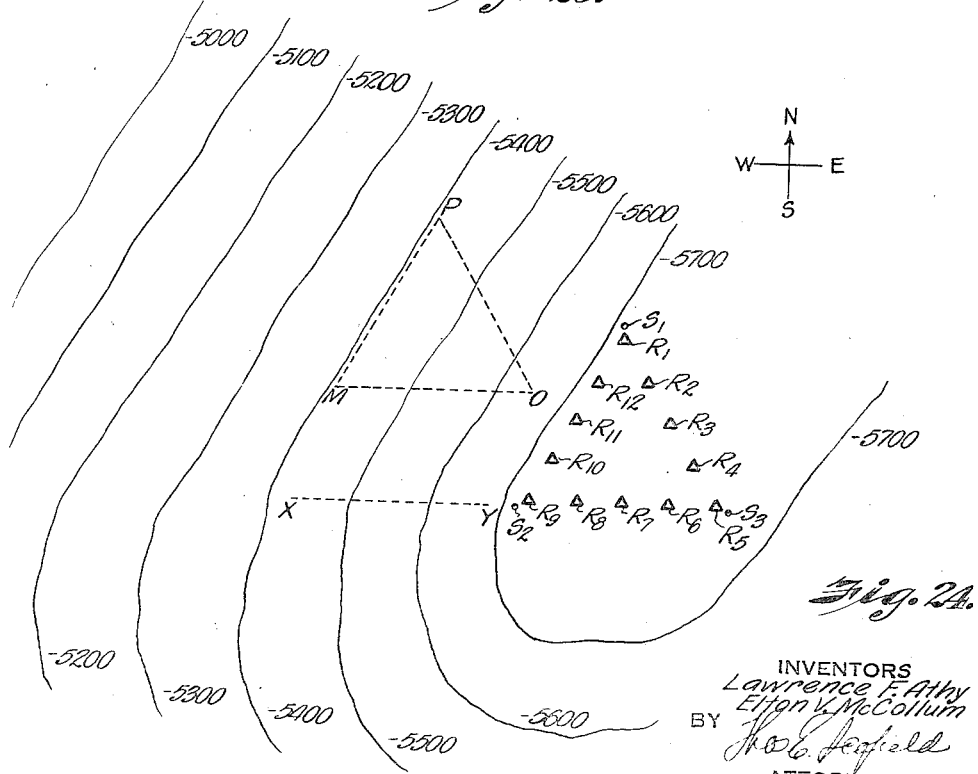
Figure 24 is a plan view of a polygonal spread over a subsurface contour map.

If a polygonal spread such as a triangular spread, is shot over an inclined subsurface formation, the reflected polygon will be displaced up dip. This is shown in Figure 24 in which a spread comprising shoe holes $S_1$, $S_2$ and $S_3$ with intermediate lines of seismophones, is shown over a contour in which the subsea level data on the reflecting bed range from 5.000 to 5,700 feet below sea level. The shot points $S_1$, $S_2$, and $S_3$ are on the surface of the ground. If, in line profiling, a shot is fired at $S_2$ and received by seismophones $R_5$, $R_6$, $R_7$, $R_8$ and $R_9$ and then a shot fired at shot point $S_3$ and received by seismophones $R_5$, $R_6$, $R_7$, $R_8$, and $R_9$, a line M—O extending from west to east will be obtained. The dip of this line may be calculated but the position at which the dip component should be plotted is unknown. It may be northwest, west, or southwest of the line of seismophones comprising $R_9$, $R_8$, $R_7$, $R_6$ and $R_5$. If it is assumed that the line of seismophones extend in the true direction of dip, the dip component would be incorrectly plotted at line X—Y. If, however, an additional shot point $S_1$ is drilled and seismophones $R_1$, $R_2$, $R_3$, $R_4$, and $R_5$ spread between shot points $S_1$ and $S_3$, and additional seismophones $R_1$, $R_{12}$, $R_{11}$, $R_{10}$, and $R_9$ positioned between shot holes $S_1$ and $S_2$, three dip components are obtained, namely the dip between M and O, the dip between M and P, and the dip between P and O. These dip components can then be plotted in their true positions since the amount and direction of true dip and strike will then be available.

The number and spacing of seismophones used in carrying out our method may be varied. The seismophones should be sufficient in number and of such spacing as to permit ready correlation of reflected waves from one seismophone record trace to another. Seismophone positions are normally between 50 and 200 feet apart when a single seismophone output is recorded on each oscillograph trace on a seismograph record. If desired, we may employ groups of seismophones whose output is cumulated and recorded on a single oscillograph trace. We have, for example, used 40 seismophones recording with 10 oscillographs cumulating the output of 4 seismophones to actuate each oscillograph. The use of a greater number of seismophones recording in composite groups enables us to space shot points greater distances apart. In some areas, where dips are steep or for other reasons, we may employ a distance between shot holes in a polygonal pattern as small as from 400 to 800 feet. In other areas, the distance may be as great as from 3,000 feet to 5,000 feet.

It will be observed that our method has many advantages. We are enabled to make accurate weathering corrections employing seismophone positions at once useful in obtaining dip and depth. Accurate dips can be calculated from the several component dips obtainable by our method. The observed reflection travel times from one reflecting bed can be traced entirely around a polygonal figure and thereby provide a check as to the accuracy or dependability of the observed travel times. If the travel time traverse does not correspond with the average error, it will be obvious that the times are not reliable at least to the extent of failure of correspondence. Phasing or interference of various waves of seismic energy frequently cause distortions in wave pattern on any record. This is especially noticeable in areas where reflecting structure is complex. In these areas, where it is especially important to have accurate records, errors frequently creep in, due to the fact that in an area of complex structure, reflected waves from more than one point may arrive more or less simultaneously at the seismophones. In such case, the reflection arrival may not be properly traced across a given record. Upon finding that a time traverse fails to close, we have frequently been enabled to reexamine the records and find the error made in tracing the reflection. Such errors could not be detected using the known reflection methods, and illustrate one of the advantages of our invention. Triangular spacing of shot holes and seismophones provides accurate weathering corrections and accurate three-point depths essential to the determination of the true dip or slope of a plane, with a minimum number of shot points and seismophone spreads. We are enabled to determine the areal extent of a geological layer and to locate and accurately determine a fault.

It will be observed that we have accomplished the objects of our invention and have provided a novel method of seismic surveying and geophysical explorations, enabling us to contour subsurface formations with a degree of accuracy heretofore unknown, and to conduct explorations in areas in which it has not been possible to conduct reliable explorations. Our method reduces interpretation work to a mere mechanical technique and leaves as little as possible to the opinion of the interpreter. In cases where faults exist and it has been heretofore impossible to correlate seismophones, the interlocking records obtained with our method enable ready correlation.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. The method of profiling at least one subsurface stratum which comprises producing seismic waves at a first source, receiving seismic waves from said first source after reflection from said stratum at two or more reception points spaced from said source and out of line therewith, recording the effects of said seismic waves as a plurality of traces on a common record; producing seismic waves at a second source spaced from said first source and out of line with said reception points, receiving seismic waves from said second source after reflection from said stratum at said reception points, and recording the effects of said last mentioned seismic waves as a plurality of traces on a second common record, the length of the reflected wave path between said first source and one of said reception points being substantially the same as the length of the reflected wave path between said second source and the other of said reception points, and said two reflected wave paths having substantially identical reflection points on said subsurface stratum.

2. The method of claim 1 in which a line drawn from said first source to said second source is substantially parallel to but spaced substantially from a line drawn through said reception points.

3. The method of profiling at least one subsurface stratum which comprises producing seismic waves at a first source, receiving seismic waves from said first source after reflection from said stratum at a plurality of reception points spaced from said source and out of line therewith, recording the effects of said seismic waves as a plurality of traces on a common record; producing seismic waves at a second source spaced from said first source, receiving seismic waves from said second source after reflection from said stratum at said plurality of reception points, and recording the effects of said last mentioned seismic waves as a plurality of traces on a second common record, the length of the reflected wave path between said first source and one of said plurality of reception points being substantially the same as the length of the reflected wave path between said second source and another of said plurality of reception points, the reflection points on said stratum for said two reflected wave paths being sufficiently close together to assure accurate correlation between said two records.

4. The method of profiling at least one subsurface stratum which comprises producing seismic waves at a first source, receiving seismic waves from said first source after reflection from said stratum at a plurality of reception points spaced from said source and out of line therewith, recording the effects of said seismic waves as a plurality of traces on a common record; producing seismic waves at a second source spaced from said first source and out of line with said reception points, receiving seismic waves from said second source after reflection from said stratum at a second plurality of reception points spaced from said first plurality of reception points, recording the effects of said last mentioned seismic waves as a plurality of traces on a second common record, the length of the reflected wave path between said first source and one of the reception points used therewith being substantially the same as the length of the reflected wave path between said second source and one of the reception points used therewith, and said two reflected wave paths having substantially identical reflection points on said stratum.

5. The method of profiling at least one subsurface stratum which comprises producing seismic waves at a first source, receiving seismic waves from said first source after reflection from said stratum at a plurality of reception points spaced from said source and out of line therewith, recording the effects of said seismic waves as a plurality of traces on a common record; producing seismic waves at a second source spaced from said first source and out of line with said reception points, receiving seismic waves from said second source after reflection from said stratum at a second plurality of reception points spaced from said first plurality of points, recording the effects of said last mentioned seismic waves as a plurality of traces on a second common record, the length of the reflected wave path between said first source and one of the reception points used therewith being substantially the same as the length of the reflected wave path between said second source and one of the reception points used therewith, the reflection points on said stratum for said two reflected wave paths being sufficiently close together to permit accurate correlation between said two records.

6. A method of continuous profiling using a line of spaced seismic wave generating stations and a substantially parallel spaced line of seismic wave receivers, comprising, generating seismic waves at one of said seismic wave generating stations, receiving reflected seismic waves at a plurality of said seismic wave receivers, recording the effects of said received seismic waves as a plurality of traces on a common record, generating seismic waves at a second of said seismic wave generating stations, receiving reflected seismic waves at the aforementioned plurality of seismic wave receivers, recording the effects of said last mentioned seismic waves as a plurality of traces on a second common record, the distance from the first seismic wave generating station to one of the seismic wave receivers used therewith being substantially the same as the distance from the second seismic wave generating station to another of said receivers.

7. A method according to claim 6 in which said parallel lines are from about 100 feet to about 300 feet apart.

8. A method according to claim 6 in which said seismic wave generating stations are at least about 1000 feet apart.

9. A method of continuous profiling using a line of spaced seismic wave generating stations and a substantially parallel spaced line of seismic wave receivers, comprising, generating seismic waves at one of said seismic wave generating stations, receiving reflected seismic waves at a plurality of said seismic wave receivers, recording the effects of said received seismic waves as a plurality of traces on a common record, generating seismic waves at a second of said seismic wave generating stations, receiving reflected seismic waves at the aforementioned plurality of seismic wave receivers, recording the effects of said last mentioned seismic waves as a plurality of traces on a second common record, the distance from the first seismic wave generating station to one of the seismic wave receivers used therewith being substantially the same as the distance from the second seismic wave generating station to another of said receivers, generating seismic waves at said second seismic wave generating station, receiving reflected waves at a second plurality of said seismic wave receivers, said second plurality of seismic wave receivers including one seismic wave receiver located at or near the position of one of the seismic wave receivers of said first plurality of seismic wave receivers, at least some of the remainder of the seismic wave receivers of said second plurality of seismic wave receivers extending from said first plurality of seismic wave receivers in the same direction which said second seismic wave generating station is from said first seismic wave generating station, and recording the effects of said last mentioned seismic waves as a plurality of traces on a third common record.

10. A method of reflection seismic surveying using a series of spaced shot holes arranged in line with each other and a series of seismometer spreads arranged in general along a line paralleling the line of shot holes but spaced therefrom, comprising, generating, receiving and recording seismic waves using one of said shot holes and an adjacent seismometer spread, and repeating this operation progressing down the lines of shot holes and seismometer spreads moving from one shot hole to the next and from one seismometer spread position to the next, each progressive step maintaining a wave path equivalent to that of the preceding step, whereby correlation can be accomplished readily.

11. A method according to claim 10 in which said parallel lines are from about 100 feet to about 300 feet apart.

12. A method according to claim 10 in which seismic waves are generated below the bottom of the weathered formation.

13. A method of reflection seismic surveying comprising establishing two spaced seismic wave generating stations at depths at least as low as the bottom of the weathered formation, placing at least two seismometers on a line parallel to a line through said seismic wave generating stations, and positioned so that there is a seismometer opposite each of said seismic wave generating stations, generating seismic waves at one of said seismic wave generating stations, recording the instant of generation of said seismic waves, recording the arrivals of the refracted waves and waves reflected from subsurface discontinuities at said seismometers, and repeating the operation using the second of said seismic wave generating stations without substantially altering the positions of said seismometers, whereby the dip and depth of said subsurface discontinuities can be determined accurately.

14. A method of reflection seismic surveying using a series of shot holes arranged at the apices of a polygon and a series of seismometer spreads arranged between said shot holes, comprising, generating, receiving and recording seismic waves using one of said shot holes and adjacent seismometer spreads, repeating this operation progressively around the polygon from one shot hole to the next and maintaining a wave path equivalent to that of the preceding step at each progressive step whereby correlation can be readily accomplished.

15. A method of reflection seismic surveying using a triangular arrangement of shot holes with intermediate seismometer spreads, shooting at one shot hole and receiving and recording seismic wave reflections along the spread of seismometers forming the base of the triangle considering the shot point as the apex, repeating this procedure at the other two shot holes, the method being such that each successive pair of record strips will contain a reflected wave path of substantially the same length whereby correlation can be readily accomplished.

16. A method of reflection seismic surveying using three shot holes arranged at the apices of a triangle and intermediate seismometer spreads located between shot holes, comprising, generating seismic waves at one of said shot holes, receiving and recording seismic waves along adjacent seismometer spreads, repeating this operation successively at each of the other two apices and at each succeeding step maintaining a wave path equivalent to that of the preceding step whereby correlation can be readily accomplished.

17. A method of reflection seismic surveying using four shot holes arranged at the corners of a polygon, with a pair of seismometer spreads arranged along the diagonals of the polygon, comprising, generating seismic waves at one shot point, receiving and recording seismic waves along the seismometer spread forming an angle with the seismometer spread in line with which the shot point is positioned, repeating this operation at the remaining three shot points and maintaining a wave path equivalent during each recording, whereby correlation can be accomplished readily.

18. A method of reflection seismic surveying using a series of spaced shot holes arranged in line with each other and a series of seismometer spreads arranged generally along a line extending in the same direction as the line of shot holes, comprising generating, receiving and recording seismic waves using one of said shot holes and one of said seismometer spreads removed at least one spread from the shot hole, then repeating the operation at a shot hole removed at least one seismometer spread from the last used receiving spread, successively repeating the alternate operations along the line of shot holes, and maintaining an equivalent wave path on each of the records produced whereby correlation can be accomplished readily.

19. A method of reflection seismic surveying including the steps of generating seismic waves at a first shot hole, receiving and recording seismic waves along a first seismometer spread extending from said shot hole, generating seismic waves at a second shot hole at the other end of said seismometer spread and receiving and recording seismic waves along said seismometer spread, then generating seismic waves in a third shot hole removed from said first seismometer spread and said second shot hole, receiving and recording seismic waves along a second seismometer spread extending from said third shot hole in the direction in which the first seismometer spread extends from the first shot hole, said second seismometer spread being adjacent said third shot hole and also receiving and recording seismic waves from said third shot hole along said first seismometer spread, also receiving seismic waves heretofore generated from said second shot hole along said second seismometer spread, and maintaining a wave path reflected from a common reflection point on each of the records produced, whereby correlation can be accomplished readily.

20. A method as in claim 15 in which a plurality of triangularly arranged setups are employed, formed by a plurality of intersecting lines of shot holes with intermediate seismometer spreads.

21. A method as in claim 16 in which a plurality of triangularly arranged setups are employed, formed by a plurality of intersecting lines of shot holes with intermediate seismometer spreads.

LAWRENCE F. ATHY.
ELTON V. McCOLLUM.